(12) United States Patent
Tsukiji

(10) Patent No.: US 12,510,935 B2
(45) Date of Patent: Dec. 30, 2025

(54) ESTIMATION APPARATUS, APPARATUS, ESTIMATION METHOD AND COMPUTER READABLE STORAGE MEDIUM

(71) Applicant: Asahi Kasei Microdevices Corporation, Tokyo (JP)

(72) Inventor: Hidekazu Tsukiji, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 72 days.

(21) Appl. No.: 18/443,303

(22) Filed: Feb. 16, 2024

(65) Prior Publication Data

US 2024/0329693 A1  Oct. 3, 2024

(30) Foreign Application Priority Data

Mar. 29, 2023 (JP) .................................. 2023-053885

(51) Int. Cl.
*G06F 1/16* (2006.01)
*G01R 33/02* (2006.01)

(52) U.S. Cl.
CPC ............ *G06F 1/1677* (2013.01); *G01R 33/02* (2013.01)

(58) Field of Classification Search
CPC ...... G06F 1/1677; G06F 1/162; G06F 1/1624; G06F 1/1626; G06F 1/1616; G06F 1/1618; G01R 33/02; G01R 33/0206; G01R 33/022; G01R 33/025; G01R 33/0094; G01R 33/04; G01R 19/00
See application file for complete search history.

(56) References Cited

U.S. PATENT DOCUMENTS

| | | | |
|---|---|---|---|
| 6,356,741 B1 | 3/2002 | Bilotti | |
| 9,823,093 B2 | 11/2017 | Kauhaniemi | |
| 12,372,378 B2 | 7/2025 | Tsukiji | |
| 2002/0119802 A1 | 8/2002 | Hijii | |
| 2004/0056651 A1 | 3/2004 | Marietta Bersana | |
| 2012/0194308 A1* | 8/2012 | Lauder .................. | G06F 1/1626 335/219 |

(Continued)

FOREIGN PATENT DOCUMENTS

| | | |
|---|---|---|
| JP | H05250475 A | 9/1993 |
| JP | 2006010461 A | 1/2006 |

(Continued)

*Primary Examiner* — Alvaro E Fortich

(57) ABSTRACT

Provided is an estimation apparatus for estimating a position or an attitude of a second portion with respect to a first portion in an apparatus including the first portion, the second portion, a movable mechanism, a magnetic sensor, and a magnet section. The estimation apparatus includes an estimation unit which performs, based on a combination of measured values and reference information, an estimation of the position or the attitude of the second portion with respect to the first portion. The reference information includes first reference information and second reference information. The estimation apparatus includes a selection unit which selects, according to a degree of coincidence between the combination of the measured values and each of the first reference information and the second reference information, the first reference information or the second reference information which has a higher degree of coincidence as the reference information for the estimation.

12 Claims, 18 Drawing Sheets

(56) References Cited

U.S. PATENT DOCUMENTS

| | | | |
|---|---|---|---|
| 2013/0271373 A1* | 10/2013 | Milhe | G06F 1/1671 |
| | | | 345/156 |
| 2014/0355189 A1* | 12/2014 | Nakano | G06F 1/1632 |
| | | | 361/679.11 |
| 2016/0062484 A1* | 3/2016 | Sugiura | G06F 3/0202 |
| | | | 345/156 |
| 2019/0179446 A1 | 6/2019 | Kremin | |
| 2020/0116524 A1 | 4/2020 | Dupre La Tour | |
| 2020/0159336 A1* | 5/2020 | Torres | H01H 13/83 |

FOREIGN PATENT DOCUMENTS

| | | |
|---|---|---|
| JP | 2012090028 A | 5/2012 |
| JP | 2018128350 A | 8/2018 |
| JP | 2022122245 A | 8/2022 |

\* cited by examiner

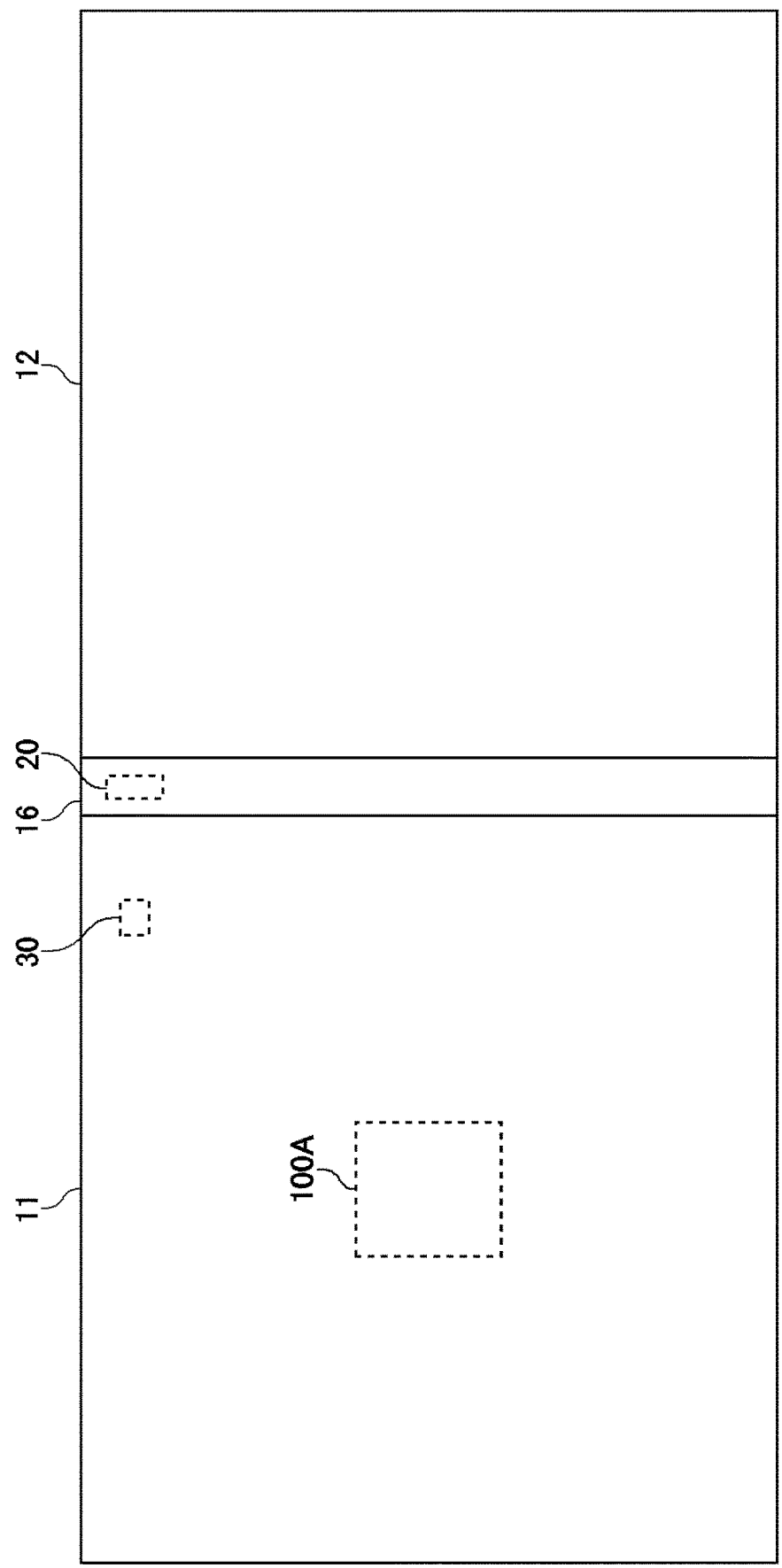

10B

ESTIMATION APPARATUS, APPARATUS, ESTIMATION METHOD AND COMPUTER READABLE STORAGE MEDIUM

BACKGROUND

1. Technical Field

The present invention relates to an estimation apparatus, an apparatus, an estimation method, and a computer readable storage medium.

2. Related Art

Patent Document 1 describes "an opening and closing terminal which allows, based on a varied distance between a magnet and a magnetic sensor according to an angle of a hinge portion, a detection of the angle of the hinge portion by using the magnetic sensor".

LIST OF CITED REFERENCES

Patent Document

Patent Document 1: Specification of U.S. Pat. No. 9,823,093

BRIEF DESCRIPTION OF THE DRAWINGS

FIG. 2 is an example of a schematic top view in the apparatus 10A.

DESCRIPTION OF EXEMPLARY EMBODIMENTS

Hereinafter, the present invention will be described through embodiments of the invention. However, the following embodiments are not for limiting the invention according to the claims. In addition, not all of the combinations of features described in the embodiments are imperative to the solving means of the invention.

Figure 1A:
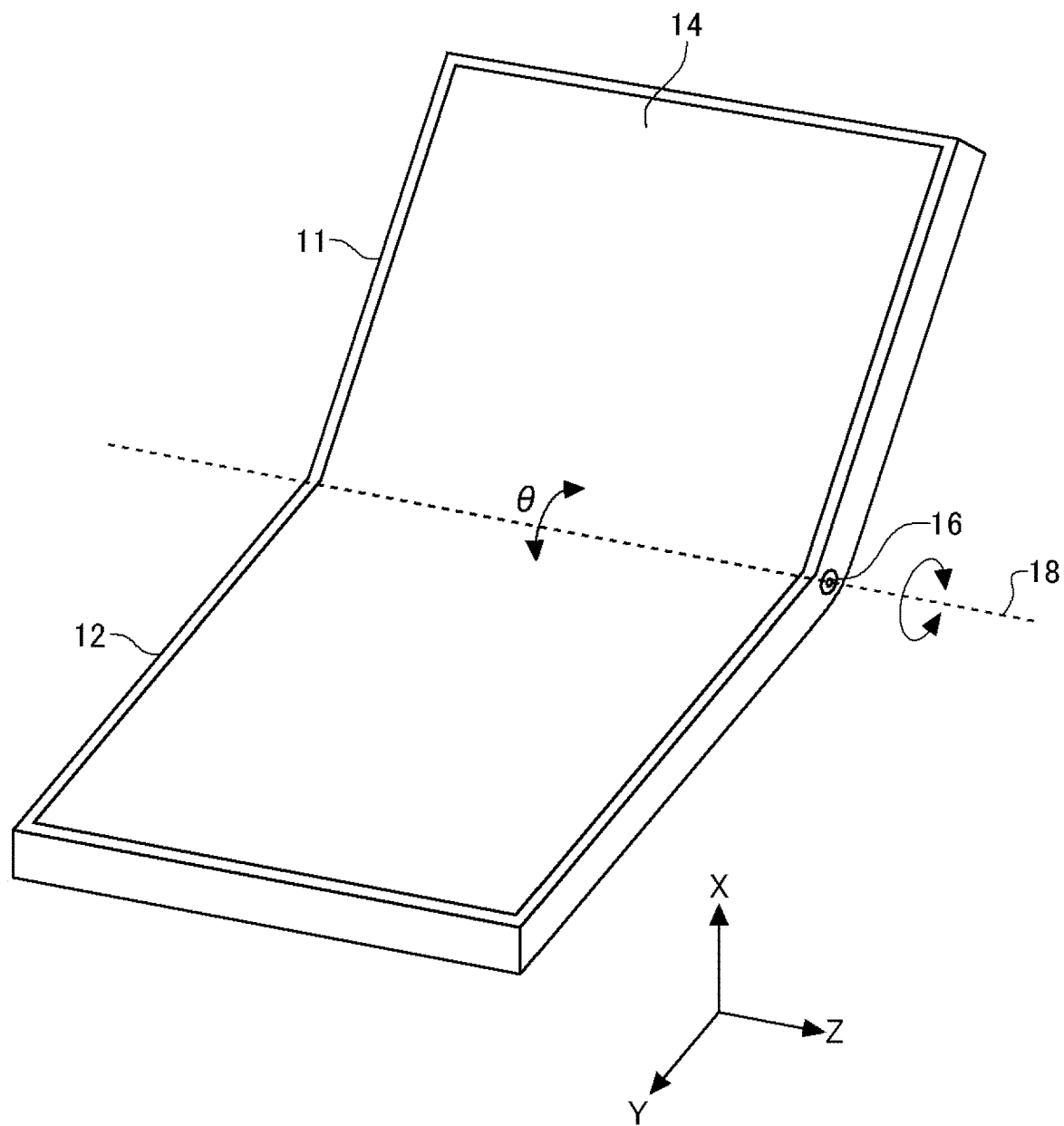
FIG. 1A is an example of an external appearance perspective view of an apparatus 10A.

FIG. 1A is an example of an external appearance perspective view of an apparatus 10A. The apparatus 10A is a collapsible terminal, and is a mobile terminal such as, for example, a smartphone, a mobile phone, a tablet, a laptop, and a small computer. In the drawing, an example is illustrated in which the apparatus 10A is a so-called foldable smartphone. The apparatus 10A includes a first portion 11, a second portion 12, a display 14, and a hinge mechanism 16.

The display 14 is a foldable display. For example, the display 14 is an organic EL (OLED) display.

The first portion 11 and the second portion 12 are parts of a housing of the apparatus 10A. The first portion 11 and the second portion 12 may be integrally configured. The hinge mechanism 16 couples the first portion 11 and the second portion 12 so as to be collapsible. The hinge mechanism 16 may be a part of the first portion 11 or the second portion 12. As an example, in the apparatus 10A of the present embodiment, the hinge mechanism 16 is a part of the second portion 12.

In the present embodiment, a description will be provided where a right-handed (positive-oriented) orthogonal coordinate system is set. A Z axis of the orthogonal coordinate system is taken in a direction of a rotational axis 18 of the hinge mechanism 16. For example, a Y axis is taken in a direction in which the first portion 11 extends from the hinge mechanism 16 in a closed state of a foldable smartphone illustrated in FIG. 1B. In this case, the first portion 11 rotates such that an angle θ that is an angle formed with respect to the second portion 12 is varied from 0 degrees to 180 degrees. It is noted however that a manner in which the Y axis is taken and a rotationally moving side out of the first portion 11 and the second portion 12 are exemplifications, and are not limited to this. As long as the angle θ formed between the first portion 11 and the second portion 12 is allowed to be varied, the second portion 12 may be rotationally moving with respect to the first portion 11.

In this manner, in the present embodiment, the first portion 11 varies the attitude with respect to the second portion 12 by a rotation via the hinge mechanism 16. The hinge mechanism 16 used in a mobile terminal may be a hinge mechanism which can maintain the angle θ of the second portion 12 with respect to the first portion 11 at a desired angle from 0 degrees to 180 degrees, and may be a so-called torque hinge. The hinge mechanism 16 is an example of a "movable mechanism" which changes the attitude of the second portion 12 with respect to the first portion 11.

Figure 1B:
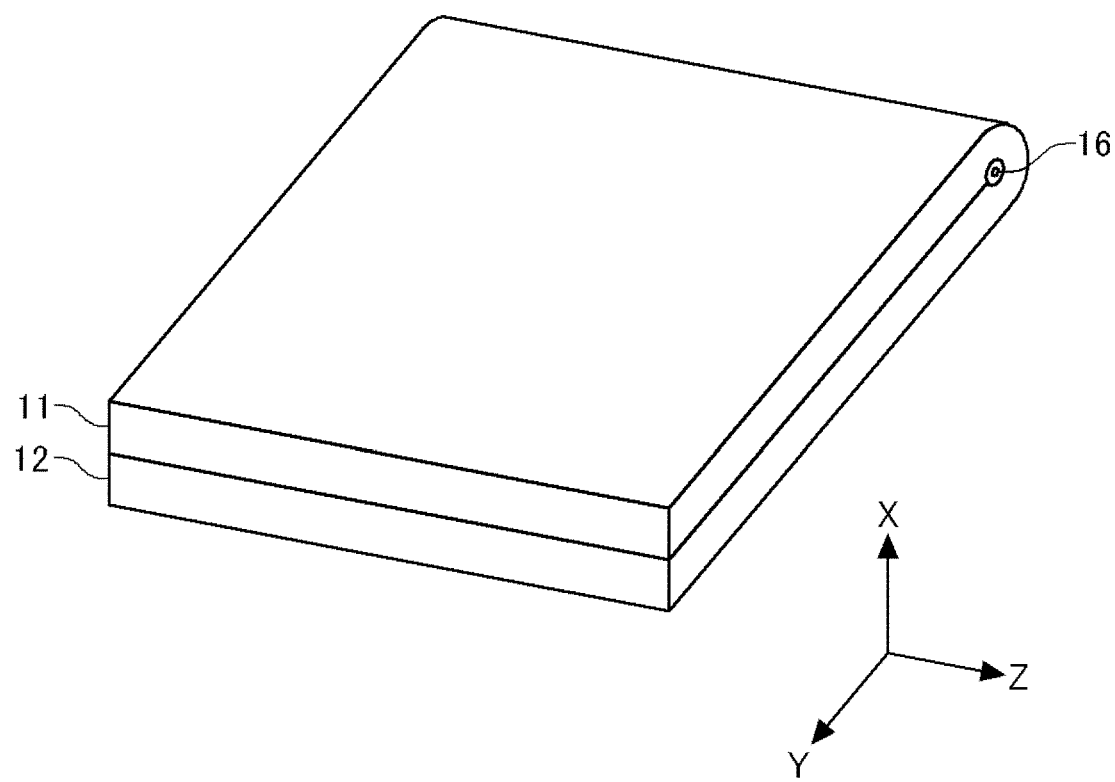
FIG. 1B is an example of the external appearance perspective view of the apparatus 10A in a closed state.

FIG. 1B is an example of the external appearance perspective view of the apparatus 10A in the closed state. A state in which the foldable smartphone is in the "closed state" refers to a case where, as illustrated in the drawing, the angle θ formed between the first portion 11 and the second portion 12 is in a state at 0 degrees, and refers to a state in which the first portion 11 is in the closed state with respect to the second portion 12.

Herein, in the present embodiment, a state in which the apparatus 10A is in the "closed state" refers to a state in which the second portion 12 is in a "first attitude" with respect to the first portion 11. It is noted however that a manner in which the "first attitude" in the present embodiment is defined is an exemplification, and a different attitude of the second portion 12 with respect to the first portion 11 may be defined as the "first attitude".

Figure 1C:
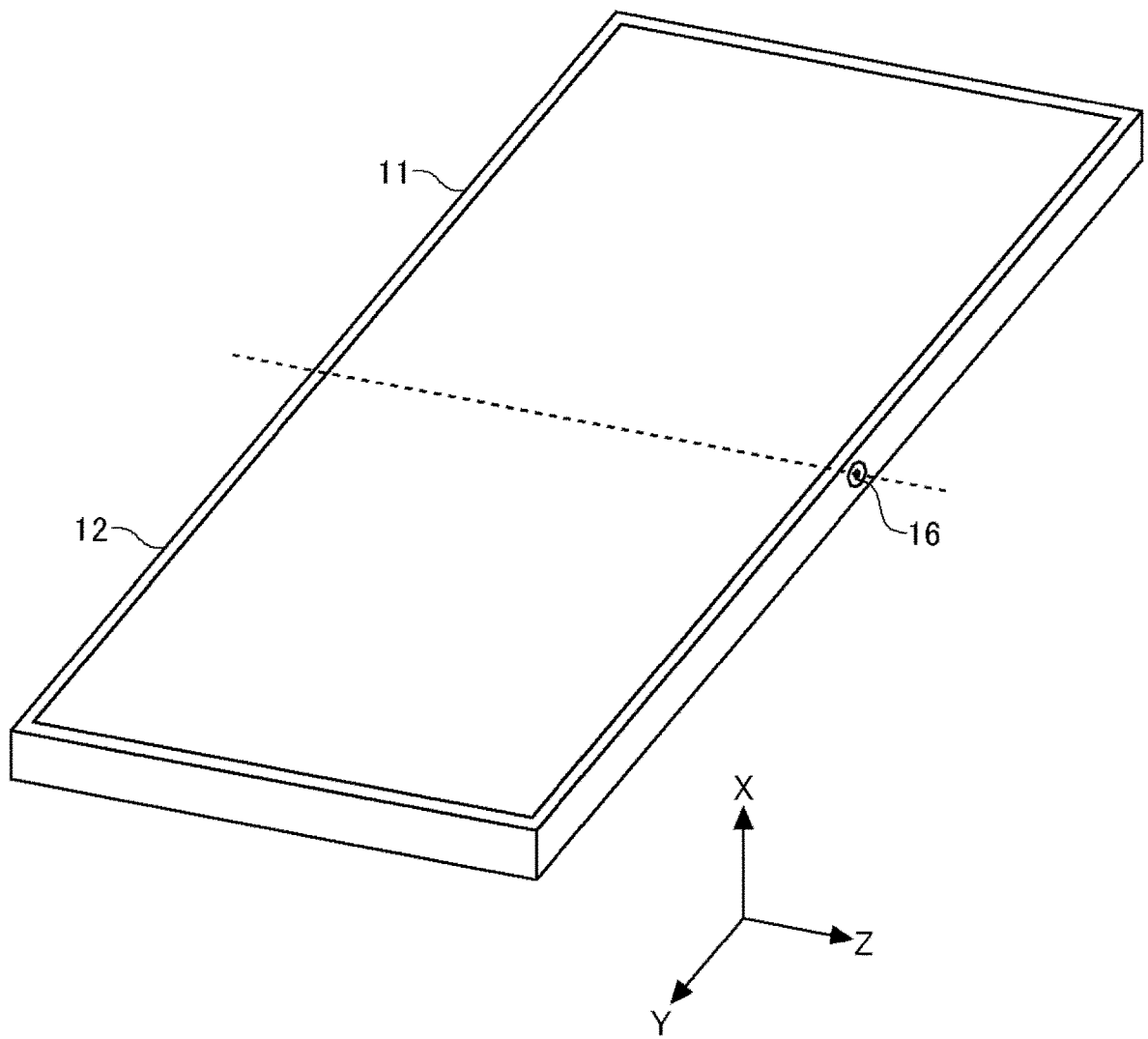
FIG. 1C is an example of the external appearance perspective view of the apparatus 10A in an open state.

FIG. 1C is an example of the external appearance perspective view of the apparatus 10A in an open state. A state in which the apparatus 10A is in the "open state" refers to a case where, as illustrated in the drawing, the angle θ formed between the first portion 11 and the second portion 12 is in a state at 180 degrees, and refers to a state in which the first portion 11 is not collapsed with respect to the second portion 12.

Herein, in the present embodiment, a state in which the apparatus 10A is in the "open state" refers to a state in which the second portion 12 is in a "second attitude" with respect to the first portion 11. It is noted however that a manner in which the "second attitude" in the present embodiment is defined is an exemplification, and a different attitude of the second portion 12 with respect to the first portion 11 may be defined as the "second attitude".

In this manner, the hinge mechanism 16 of the present embodiment allows an operation for causing the apparatus 10A to change from the "closed state" to the "open state", that is, from the "first attitude" to the "second attitude" (which is an example of a "first operation"). In addition, the hinge mechanism 16 allows an operation for causing the apparatus 10A to change from the "open state" to the "closed state", that is, from the "second attitude" to the "first attitude" (which is an example of a "second operation").

FIG. 2 is an example of a schematic top view of the apparatus 10A in the open state. The apparatus 10A includes a magnet section 20, a magnetic sensor 30, and an estimation apparatus 100A. As will be described below in detail, by using the magnet section 20 and the magnetic sensor 30, the apparatus 10A of the present embodiment can accurately estimate the angle θ formed between the first portion 11 and the second portion 12.

The magnet section 20 includes a magnet which generates a magnetic field which is varied according to the angle between the first portion 11 and the second portion 12. With this configuration, the magnet section 20 provides the magnetic field to be measured by the magnetic sensor 30. The magnet section 20 of the present embodiment is provided in the hinge mechanism 16 configuring a part of the second portion out of the first portion 11 and the second portion 12, and the magnetic sensor 30 is provided in the first portion 11 which does not configure the hinge mechanism 16 out of the first portion 11 and the second portion 12.

It is noted however that it suffices when the magnet section 20 is provided in a position where a magnetic flux density according to an angle can be detected by a relative position with respect to the magnetic sensor 30. The magnet section 20 may be provided in one of the first portion 11 or the second portion 12, and the magnetic sensor 30 may be provided in another of the first portion 11 or the second portion 12. Accordingly, in an example in which the magnet section 20 is provided in the first portion 11, the magnetic sensor 30 may be provided in the second portion 12.

The magnetic sensor 30 detects a magnetic field (or a magnetic flux density; this may be hereinafter simply referred to as a magnetic field including a meaning of the magnetic flux density since the magnetic flux density is obtained by multiplying the magnetic field by magnetic permeability) at a certain time point according to the angle between the first portion 11 and the second portion 12. The magnetic sensor 30 outputs a voltage or a current according to a measured value of the magnetic flux density at a time point of measurement. For example, the magnetic sensor 30 is a Hall element. The time point at which the magnetic flux density is measured by the magnetic sensor 30 is an example of a "first time point".

In the apparatus 10A, at least one magnetic sensor 30 is provided. In the present embodiment, a description will be provided where the number of magnetic sensors 30 is assumed to be one. In particular, an example will be hereinafter described in which magnetic flux densities in a plurality of different directions are measured by the single magnetic sensor 30. However, in the apparatus 10A, the number of magnetic sensors 30 to be provided may be two or more as desired.

The estimation apparatus 100A estimates the angle θ based on the measured value of the magnetic flux density sensed by the magnetic sensor 30. Note that the estimation of the angle θ is an example of an estimation of the attitude that is varied due to a rotational motion through the hinge mechanism 16 of the second portion 12 with respect to the first portion 11.

The apparatus 10A performs a predetermined operation based on the angle estimated by the estimation apparatus 100A. The apparatus 10A may display different images in a display section of the first portion 11 and a display section of the second portion 12 based on the angle estimated by the estimation apparatus 100A. For example, when the angle estimated by the estimation apparatus 100A falls within a predetermined angle range from 90 degrees to 120 degrees or the like, the apparatus 10A may display an operational functionality such as a keyboard in the display section of the second portion 12, and may display a display functionality for displaying an image such as, for example, a document or a video, according to content of an operation by the operational functionality in the display section of the first portion 11. Hereinafter, with reference to FIG. 3, an internal configuration and the functionality of the estimation apparatus 100A will be further described.

Figure 3:
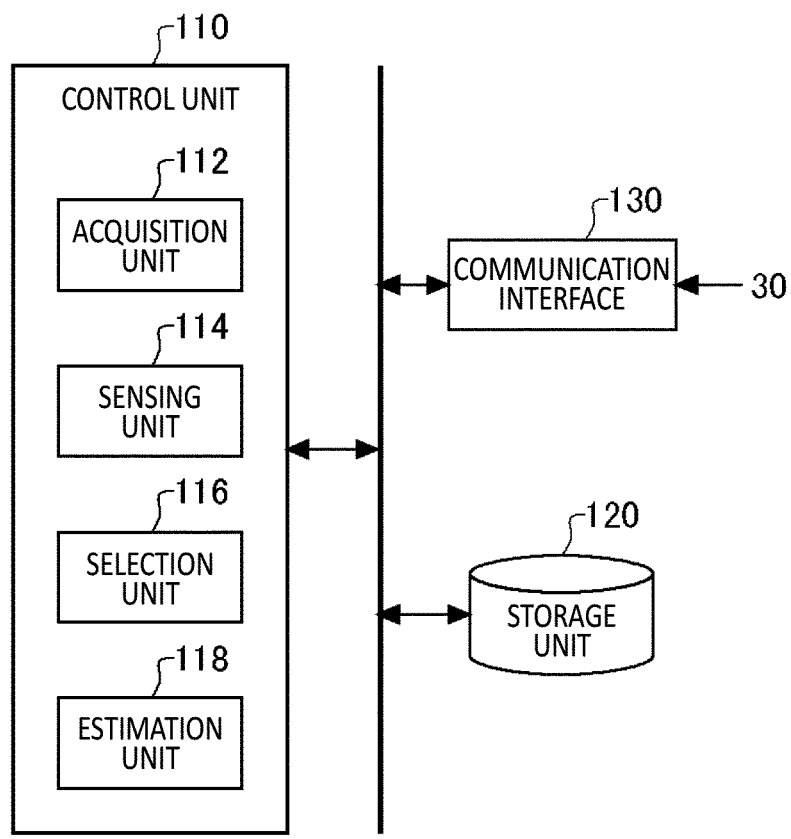
FIG. 3 illustrates an example of a configuration of an estimation apparatus 100A.

FIG. 3 illustrates an example of a configuration of the estimation apparatus 100A. The estimation apparatus 100A includes a control unit 110, a storage unit 120, and a communication interface 130. The estimation apparatus 100A may be configured by a computer including a CPU and a memory. The CPU may function as the control unit 110, and the memory may function as the storage unit 120.

The control unit 110 estimates the angle θ corresponding to the measured value based on the measured value of the magnetic flux density by the magnetic sensor 30 which is received from the communication interface 130 and reference information stored in the storage unit 120, and performs control so as to cause the apparatus 10A to function based on the estimated angle.

The storage unit 120 stores the reference information in which a combination of measured values of each component of the magnetic flux density detected by the magnetic sensor 30 is associated with the angle between the first portion 11 and the second portion 12. As an example, the reference information is a figure of a hysteresis curve drawn in a case where at least two components among a component in an X axis direction, a component in an Y axis direction, and a component in a Z axis direction of the magnetic flux density (hereinafter, which may be respectively referred to as an X component, a Y component, and a Z component) are set as coordinate axes.

The communication interface 130 receives the measured value of the magnetic flux density measured by the magnetic sensor 30. The communication interface 130 communicates with the magnetic sensor 30 via a signal line.

The control unit 110 performs the estimation of the angle θ of the second portion 12 with respect to the first portion 11 based on the X component, the Y component, and the Z component of the magnetic flux density, and the reference information to control the operation of the apparatus 10A. Hereinafter, with reference to FIG. 4A to FIG. 7, a principle for the control unit 110 to perform the estimation of the angle θ will be described, and subsequently, a description of an internal configuration and a functionality of the control unit 110 will be provided.

Figure 4A:
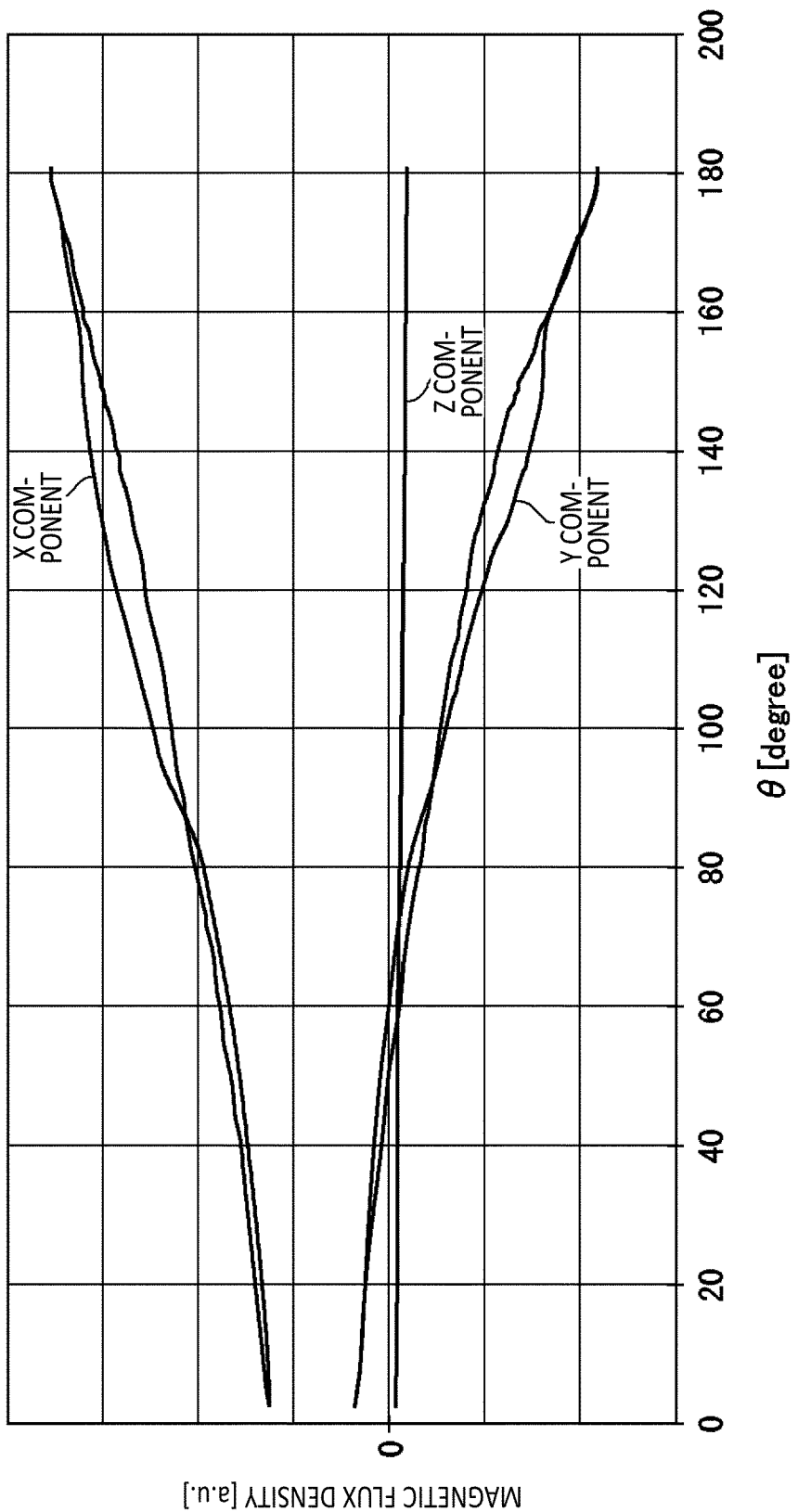
FIG. 4A illustrates an example of a magnetic flux density according to an angle θ between a first portion 11 and a second portion 12 which is detected by a magnetic sensor 30.

FIG. 4A illustrates an example of the magnetic flux density according to the angle θ between the first portion 11 and the second portion 12 which is detected by the magnetic sensor 30. The drawing illustrates each of the X component, the Y component, and the Z component in an XYZ coordinate system of the magnetic flux density in a case of transition of the apparatus 10A from the closed state to the open state and transition from the open state to the closed state again (that is, a case of reciprocating once from the closed state to the closed state via the open state). Note that in the present specification, each graph below is to exemplify and describe components of each magnetic flux density with respect to the angle, or a relationship between components of each magnetic flux density and a shape or the like of a figure indicating the relationship. Accordingly, each component of the magnetic flux density in each graph is indicated as a value in an arbitrary unit (a.u.).

In a case of transition of the apparatus 10A from the closed state to the open state and transition from the open state to the closed state again, a state transition operation is switched in an attitude in which the angle θ of the second portion 12 with respect to the first portion 11 is 180 degrees.

Furthermore, the angle θ of the second portion 12 with respect to the first portion 11 in the closed state when the operation is to be started and the angle θ of the second portion 12 with respect to the first portion 11 in the closed state when the operation is to be ended are both θ=0 degrees and equal to each other. Accordingly, the magnetic field of each component measured by the magnetic sensor 30 at the time of the operation start and the magnetic field of each component measured by the magnetic sensor 30 at the time of the operation end approximately match. Accordingly, in the drawing, the X component, the Y component, and the Z component of the magnetic flux density draw almost closed curves.

However, the curve drawn by the X component of the magnetic flux density during the transition from the closed state to the open state and the curve drawn by the X component of the magnetic flux density during the transition from the open state to the closed state draw different trajectories due to an impact of a magnetic hysteresis to reach ends of the curves. For example, the impact of the magnetic hysteresis appears in each component of the X component, the Y component, and the Z component of the magnetic flux density, but with regard to an appearing manner in each component of the impact of the magnetic hysteresis, the impact appears in different magnitudes based on relative positions of the magnet section 20 and the magnetic sensor 30. Note that during opening and closing operations of the apparatus 10A, depending on how much force is applied to the hinge, in the apparatus 10A, a positional relationship between the magnet section 20 and the magnetic sensor 30 may be slightly varied. This impact may also appear as a hysteresis in the magnetic flux density measured by the magnetic sensor 30.

Figure 4B:
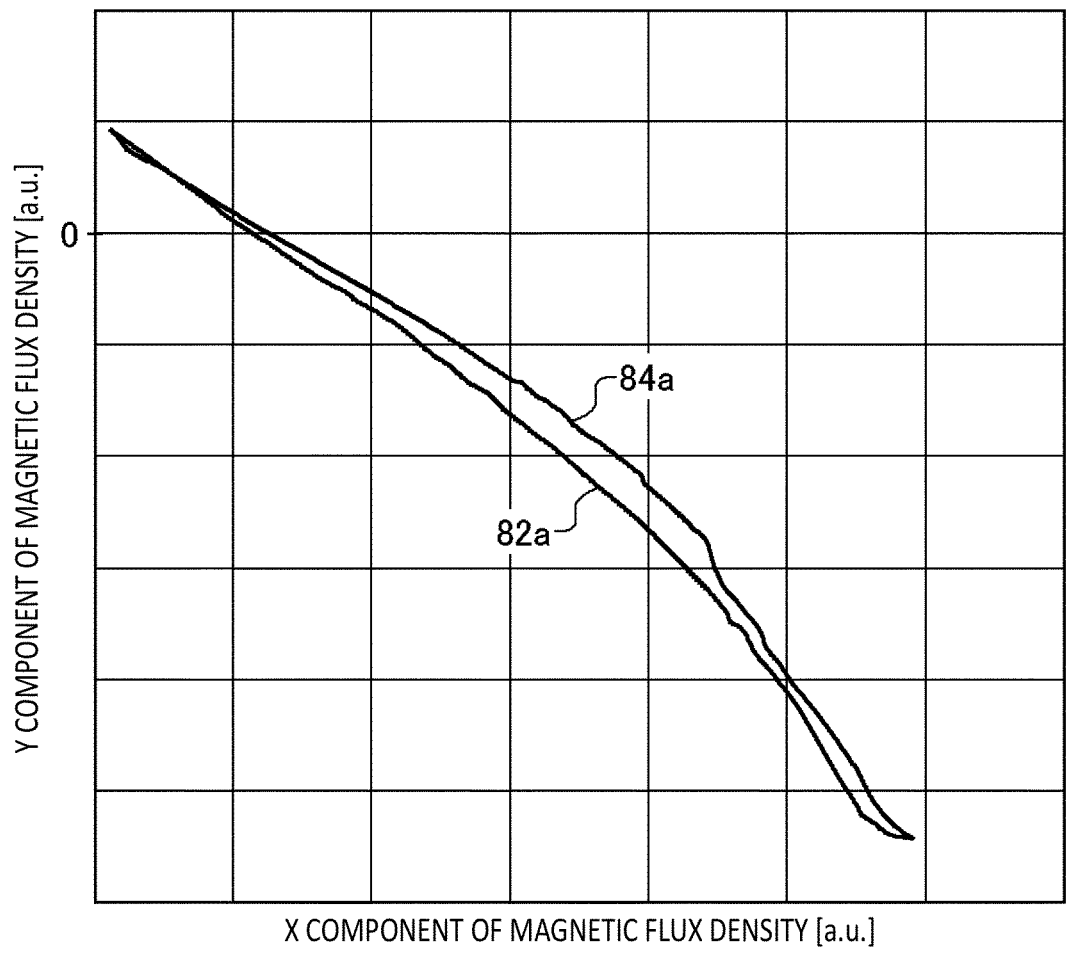
FIG. 4B is a graph illustrating an X component and a Y component of a magnetic field illustrated in FIG. 4A.

FIG. 4B is a graph illustrating the X component and the Y component of the magnetic field illustrated in FIG. 4A. To illustrate the X component and the Y component of the magnetic flux density in the drawing, a figure of a hysteresis curve of an almost closed curve can be drawn in which the angle θ is set as a parameter which does not directly appear in the drawing.

In the drawing, in particular, during the first operation for the transition by the apparatus 10A from the closed state to the open state, a curve obtained by linking the X components and the Y components of the measured values of the magnetic sensor 30 is illustrated as a curve 82a. On the other hand, subsequently, during the second operation for the transition by the apparatus 10A from the open state to the closed state, a curve obtained by linking the X components and the Y components of the measured values of the magnetic sensor 30 is illustrated as a curve 84a. Due to the impact of the magnetic hysteresis, these curves 82a and 84a take different trajectories to reach coordinates that approximately match at the ends.

In order to draw such a hysteresis curve, components of the magnetic flux density in two different axial directions in the XYZ coordinate system are selected. As in the present embodiment, when the Z axis is taken in substantially parallel to the rotational axis 18 of the second portion 12 with respect to the first portion 11, for example, components in the directions of the two axes other than the Z axis, that is, the X component and the Y component may be used. It is noted however that a manner of selecting the two components is not limited to this example, and another manner of selecting, that is, the Y component and the Z component or the Z component and the X component may be used.

A position on the hysteresis curve depends on the angle θ that is a parameter. When the X component and the Y component of the measured value of the magnetic flux density are acquired, the estimation apparatus 100A can estimate the angle θ between the first portion 11 and the second portion 12 by identifying the position on the hysteresis curve of the measured values and deriving the angle θ corresponding to the position.

Figure 5A:
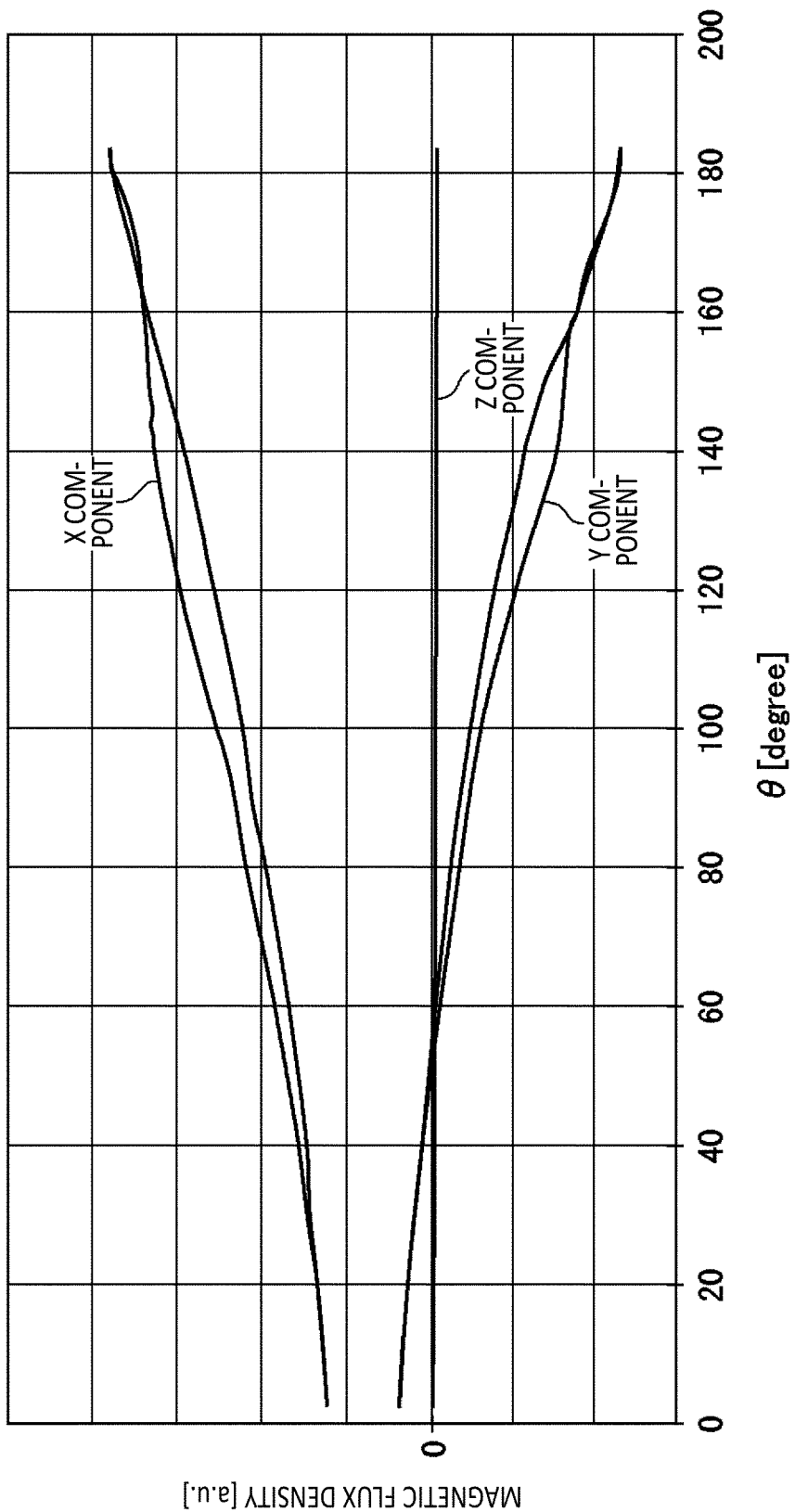
FIG. 5A illustrates another example of the magnetic flux density according to the angle θ between the first portion 11 and the second portion 12 which is detected by the magnetic sensor 30.

FIG. 5A illustrates another example of the magnetic flux density according to the angle θ between the first portion 11 and the second portion 12 which is detected by the magnetic sensor 30. As illustrated in the drawing, when attempts of opening and closing are different due to a detection error of the sensor, a magnetic field of an external environment, an impact from the magnetic hysteresis, or the like, an angular component of the magnetic flux density may draw a different trajectory.

In curves in which a horizontal axis represents the angle θ and a vertical axis represents the magnetic flux density (or the magnetic field), for example, several differences are found when FIG. 4A is compared with FIG. 5A. In the curves drawing the X component of the magnetic flux density of FIG. 4A, at the angle θ of around 85 degrees, the curve drawn during the transition from the closed state to the open state intersects with the curve drawn during the transition from the open state to the closed state. On the other hand, in the curves drawing the X component of the magnetic flux density of FIG. 5A, the curves drawing the closed curve do not intersect at points other than the end points.

Furthermore, in the curves drawing the Y component of the magnetic flux density of FIG. 4A, at the angle θ of around 90 degrees, the curve drawn during the transition from the closed state to the open state intersects with the curve drawn during the transition from the open state to the closed state. In the curves drawing the Y component of the magnetic flux density of FIG. 5A, at the angle θ of around 90 degrees, both curves do not intersect with each other.

In this manner, when the attempts of opening and closing are different, the curve drawing the angle θ and the magnetic flux density may have a varied geometric feature. However, as will be described below with reference to FIG. 4B and FIG. 5B, when expansion or reduction and parallel movement are performed on a figure of the hysteresis curve to be drawn among each component of the magnetic flux density, geometric features of the X component and the Y component of the magnetic flux density approximately match.

Figure 5B:
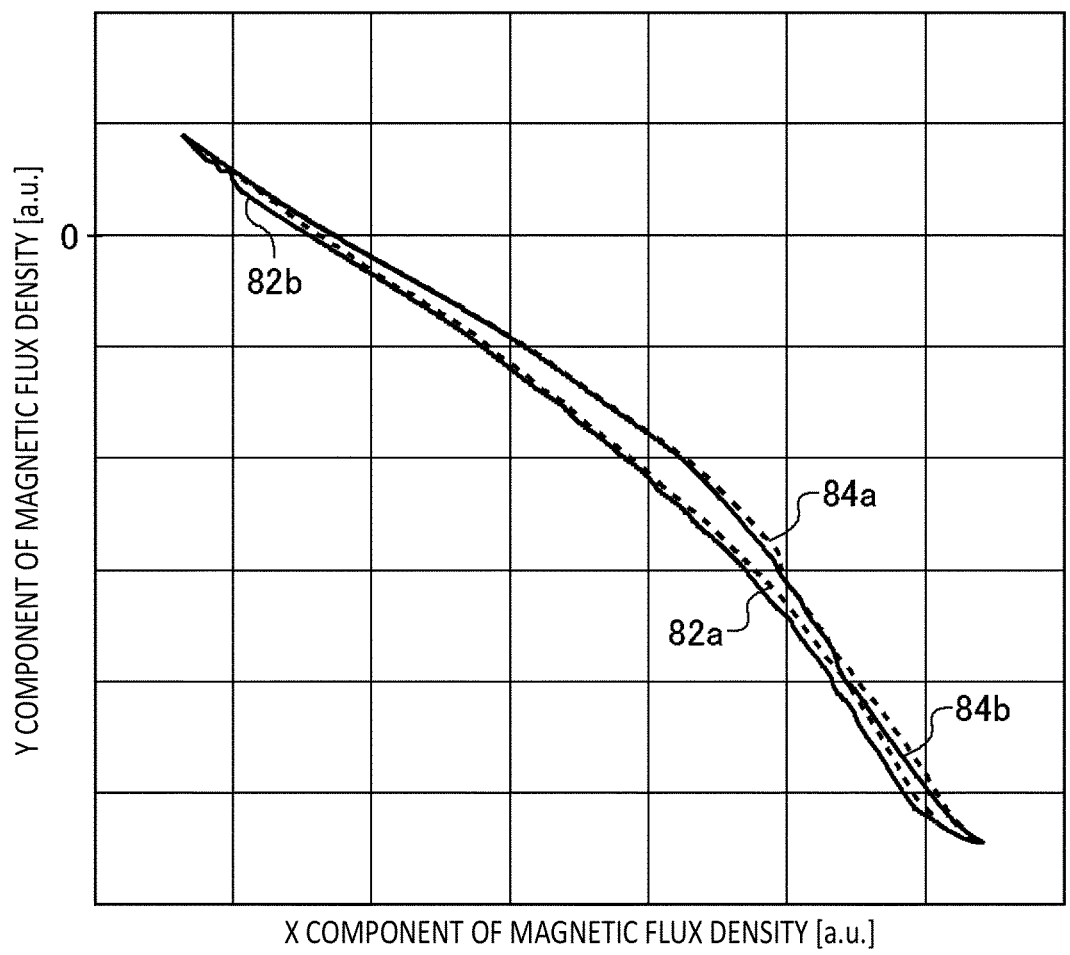
FIG. 5B is a diagram in which curves 82b and 84b obtained in such a manner that curves drawn by an X component and a Y component of a magnetic field illustrated in FIG. 5A are expanded or reduced and moved in parallel, and curves 82a and 84a illustrated in FIG. 4B are arranged side by side.

FIG. 5B is a diagram in which curves 82b and 84b obtained in such a manner that curves drawn by the X component and the Y component of the magnetic field illustrated in FIG. 5A are expanded or reduced and moved in parallel, and the curves 82a and 84a illustrated in FIG. 4B are arranged side by side. In the present specification, hereinafter, a combination of the curve 82a linking the measured values in the first operation and the curve 82b obtained in such a manner that the curve linking the measured values is expanded or reduced and moved in parallel, and the curve 84a linking the measured values in the second operation and the curve 84b obtained in such a manner that the curve linking the measured values is expanded or reduced and moved in parallel may be collectively referred to as curves 82 and 84.

As illustrated in the drawing, each of the curves 82a and 82b and the curves 84a and 84b has some deviation but draws an approximately matching outline in many geometric features including a feature on whether the curves 82a and 84a or the curves 82b and 84b intersect with each other, and the like. In this manner, even when the X component and the Y component of the magnetic flux density component experience the detection error of the sensor, the variation in the external environment, the impact from the hysteresis, or the like every attempt of opening and closing, the curves drawn by the X component and the Y component of the magnetic flux density have approximately matching outlines by being expanded or reduced and moved in parallel. Due to the match of the outlines of the mutual curves with different opening and closing attempts, the angle θ formed between the first portion 11 and the second portion 12 also indicates an approximately matching value at the measurement positions which approximately match with each other between the curves with the different opening and closing attempts.

Accordingly, information on the hysteresis curves (the curves 82 and 84) drawn by the X component and the Y component of the magnetic flux density can be used as the "reference information" indicating a combination of the measured value of the X component and the measured value of the Y component. That is, by estimating the angle θ by using such reference information, even when a magnetic field in a surrounding of the apparatus 10A is varied, it is possible to suppress a reduction of an accuracy on the estimation of the position of the magnet section 20 with respect to the magnetic sensor 30. Note that in the present embodiment, the X axis direction is an example of a "first direction", the Y axis direction is an example of a "second direction", and the Z axis direction is an example of a "third direction".

In the present embodiment, the estimation apparatus 100A uses information on the curve 82 indicating the measured value of the X component and the measured value of the Y component which are measured by the magnetic sensor 30 according to the attitude of the second portion 12 with respect to the first portion 11 during the first operation for the transition by the apparatus 10A from the closed state to the open state as "first reference information". The estimation apparatus 100A further uses information on the curve 84 indicating the measured value of the X component and the measured value of the Y component which are measured by the magnetic sensor 30 according to the attitude of the second portion 12 with respect to the first portion 11 during the second operation for the transition by the apparatus 10A from the open state to the closed state as second reference information.

The first reference information may be a shape of the curve 82, and the second reference information may be a shape of the curve 84. It is noted however that the first reference information may be a combination group of numeric values of the X component and the Y component with a difference between coordinate points indicating a combination of numeric values being small enough to be able to reproduce the shape of the curve 82, accordingly, with a density of the coordinate points indicating the combination of the numeric values being dense enough to be able to reproduce the shape of the curve 82. Similarly, the second reference information may be a combination group of numeric values of the X component and the Y component with a difference between coordinate points indicating a combination of numeric values being small enough to be able to reproduce the shape of the curve 84, accordingly, with a density of the coordinate points indicating the combination of the numeric values being dense enough to be able to reproduce the shape of the curve 84.

The curve 82 is a curve corresponding to the first operation of the apparatus 10A, and the curve 84 is a curve corresponding to the second operation of the apparatus 10A. The curve 82 and the curve 84 have mutually different curvatures and trajectories, and when each component of the magnetic field has a given value, values of the corresponding angle θ are also different from each other.

The estimation apparatus 100A separately uses the first reference information corresponding to the curve 82 and the second reference information corresponding to the curve 84 among the reference information. The estimation apparatus 100A determines whether a curve linking a plurality of measured values obtained by the magnetic sensor 30 is more fit to the curve 82 corresponding to the first reference information or the curve 84 corresponding to the second reference information, and selects the reference information to be used to estimate the angle θ from the first reference information and the second reference information. With this configuration, the estimation apparatus 100A can determine whether the apparatus 10A is in any of the first operation or the second operation by using the fitting reference information, and accurately estimate the angle θ.

Figure 6:
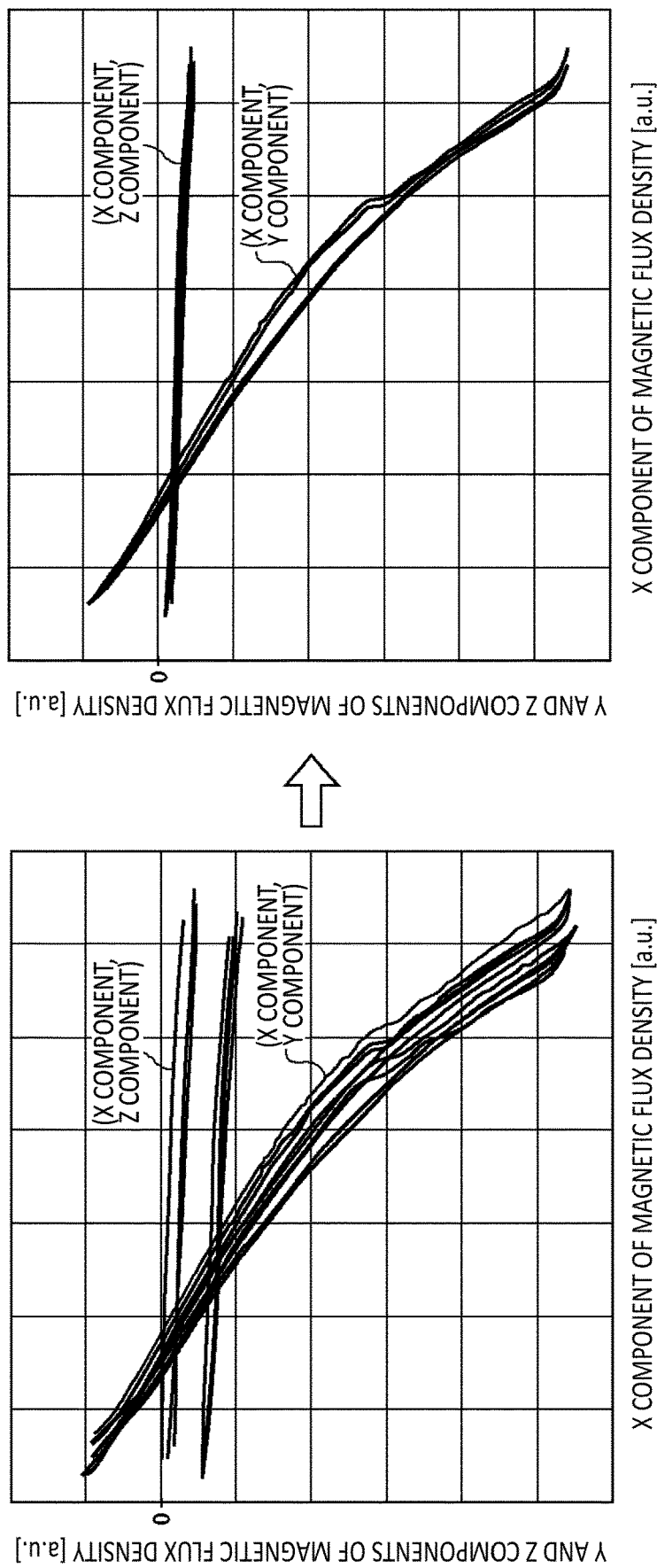
FIG. 6 represents an example of variation of a hysteresis curve when a magnet section 20 and the magnetic sensor 30 experience an impact of magnetization by an external magnetic field.

FIG. 6 represents an example of variation of the hysteresis curve when the magnet section 20 and the magnetic sensor 30 experience an impact of magnetization by an external magnetic field. Specifically, a relative positional relationship between the magnet section 20 and the magnetic sensor 30 is varied to approximate a state in which the hysteresis curve upon opening and closing of the second portion 12 with respect to the first portion 11 gradually experiences the impact of magnetic induction (magnetization) by an external factor.

In the drawing, a graph is illustrated in which a horizontal axis represents the measured value of the X component of the magnetic flux density measured by the magnetic sensor 30 and a vertical axis represents the Y component and the Z component of the magnetic flux density. A diagram on a left-hand side illustrates figures drawn by curves linking a combination of the measured values of the X component and the Y component and a combination of the measured values of the X component and the Z component. On the other hand, a diagram on a right-hand side illustrates curves obtained in such a manner that the curves drawn by the combination of the measured values of the X component and the Y component and the combination of the measured values of the X component and the Z component are expanded or reduced and moved in parallel.

In accordance with the diagram on the right-hand side, it is read that any of the curves drawn by the combination of the measured values of the X component and the Y component and the combination of the measured values of the X component and the Z component approximately matches after the curve is expanded or reduced and moved in parallel. In this manner, even when the impact of magnetic induction (magnetization) is experienced due to the external factor, the curve drawn by the combination of the measured values of the X component and the Y component and the curve drawn by the combination of the measured values of the X component and the Z component turn into the figures that approximately match by performing the expansion or the reduction and the parallel movement on the curve.

In this manner, it is further illustrated that the figures drawn by the two coordinate axis components of the magnetic flux density have stability against the detection error of the sensor, the variation in the external environment, the impact from the hysteresis, or the like. A reason for the geometric stability of the figure is that a figure is drawn in a coordinate system in which the angle θ is set as the parameter and the two coordinate axis components of the magnetic flux density are set as the axes instead of drawing a figure in which the angle θ is set as the coordinate axis.

Figure 7:
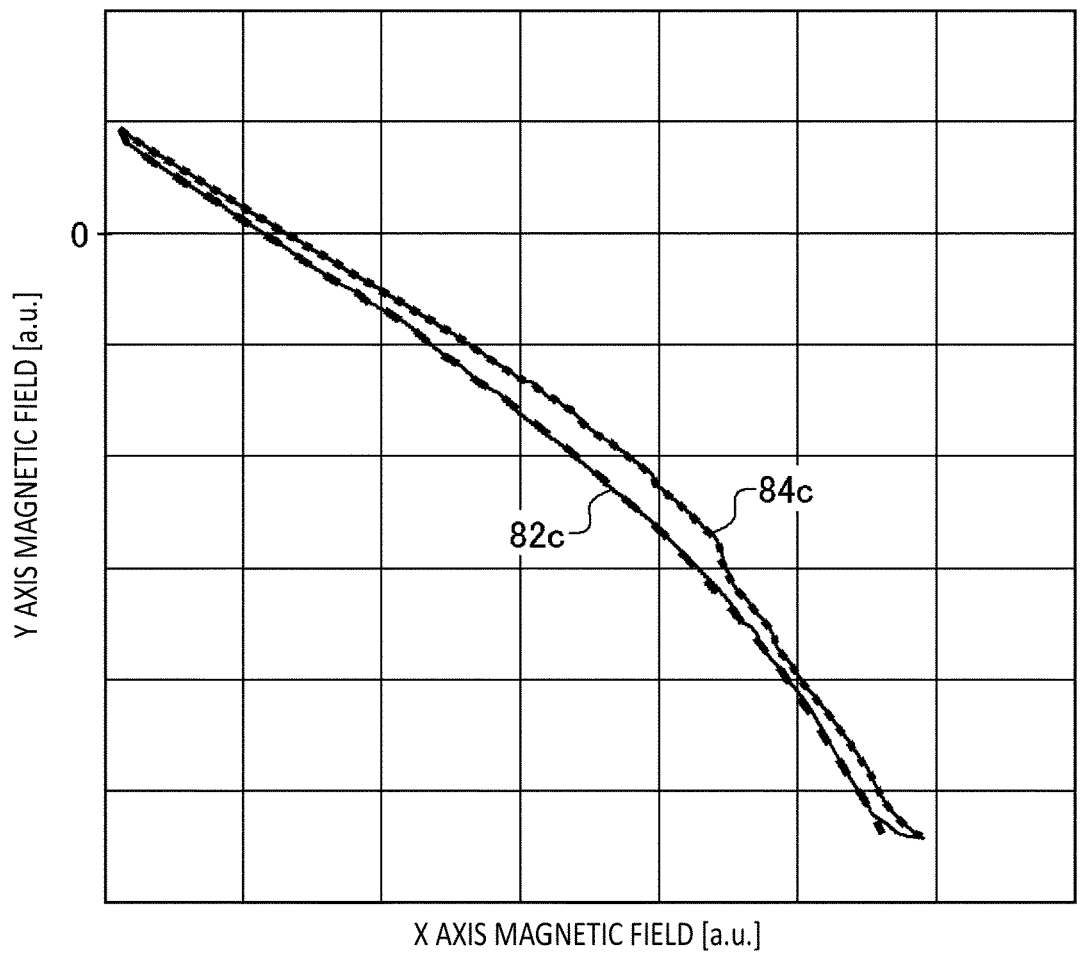
FIG. 7 Illustrates an example of first reference information and second reference information.

FIG. 7 illustrates an example of the first reference information and the second reference information. The estimation apparatus 100A uses a curve 82c showing the shape of the curve 82 as the first reference information, and a curve 84c showing the shape of the curve 84 as the second reference information.

In this manner, in the present embodiment, the reference information is represented by the figure indicated by the set of coordinate values corresponding to the attitude of the second portion 12 with respect to the first portion 11 indicated by the combination of the measured value of the X component and the measured value of the Y component on a coordinate system in which a first axis represents a measured value of a component in the first direction measured by the magnetic sensor 30 and a second axis represents a measured value of a component in the second direction measured by the magnetic sensor 30.

The one curve 82 is an example of a "first line" corresponding to the first reference information. The other curve 84 is an example of a "second line" corresponding to the second reference information. In the coordinate system in which the measured value of the X component of the magnetic field and the measured value of the Y component of the magnetic field are set as the coordinate axes, the estimation apparatus 100A selects any of the first reference information or the second reference information to be used based on a distance between coordinate values indicated by the measured value and the curve 82 or the curve 84 drawn in the coordinate system.

Here, with reference to FIG. 3 again, the internal configuration and the functionality of the control unit 110 will be described. The control unit 110 estimates the angle θ by using the figures drawn by the two coordinate axis components of the magnetic flux density as the reference information. The control unit 110 includes an acquisition unit 112, a sensing unit 114, a selection unit 116, and an estimation unit 118.

It is noted however that the control unit 110 may use the first reference information and the second reference information including a combination of coordinate values with regard to a component of linearly independent three degrees of freedom among magnetic flux densities measured by the magnetic sensor 30 as the reference information. The linearly independent three degrees of freedom may be degrees of freedom of (X, Y, Z) in axial directions in the orthogonal coordinate system, may be degrees of freedom of (r, θ, z) of a cylindrical coordinate system, or may be (r, θ, φ) of a spherical coordinate system.

The acquisition unit 112 receives a measured value of a magnetic flux density (or a magnetic field) measured by the magnetic sensor 30 from the communication interface 130, and acquires reference information from the storage unit 120. The acquisition unit 112 transmits the acquired measured value of the magnetic sensor 30 and the reference information to the sensing unit 114. The reference information includes the first reference information and the second reference information.

When the attitude of the second portion 12 with respect to the first portion 11 is to be varied, in the middle of the way of an operation for varying the attitude, the sensing unit 114 detects whether a direction of the operation is changed. Specifically, the sensing unit 114 senses a reversal operation for the second portion 12 to return to the first attitude in the middle of the way of change from the first attitude (for example, the angle θ=0 degrees) to the second attitude (for example, the angle θ=180 degrees) with respect to the first portion 11.

The sensing unit 114 may detect reversal of an operating direction based on the plurality of measured values and the reference information. For example, when a difference from the reference information of the plurality of measured values is large, the sensing unit 114 may detect change of the operating direction. The sensing of the change in the operation direction of the first portion 11 with respect to the second portion 12 which is performed by the sensing unit 114 may be based on the curve linking the measured values having change in the trajectory at a given angle (for example, 90 degrees) or more in an XY plane.

Alternatively, the sensing unit 114 may include an inertial measurement unit (IMU). The IMU is an apparatus which detects an angular velocity of the apparatus 10A centered on axes along the X axis, the Y axis, and the Z axis, and accelerations in the directions of the X axis, the Y axis, and the Z axis of the apparatus 10A. Since the sensing unit 114 includes the IMU, it is possible to sense the change in the operation direction of the second portion 12 with respect to the first portion 11 from the change in the angular velocity and the accelerations of the second portion 12 with respect to the first portion 11. With this configuration, for example, the sensing unit 114 may regard reversal of positive and negative signs of an acceleration in one axial direction as the occurrence of the change in the operation direction.

As still another embodiment, the IMU is provided in either the first portion 11 or the second portion 12, and also the sensing unit 114 may be connected to the IMU via a communication line. Note that in the present specification, unless otherwise specified such as by wired or wireless connection, a term "connected" means that both are "electrically connected" so as to be conductive via a conductive pattern, a wiring, a bonding material (solder, for example), or the like. The sensing unit 114 can sense the change in the operation direction of the second portion 12 with respect to the first portion 11 via the connected IMU. As a sensor to detect the change in the operation direction, the sensing unit 114 may include an acceleration sensor instead of the IMU or in addition to the IMU.

The sensing unit 114 outputs a sensing result of the change in the operation direction to the selection unit 116. In response to a state where the sensing unit 114 senses the change of the operation direction, the selection of the reference information which is subsequently performed by the selection unit 116 may be selected again. Alternatively, in response to a state where the sensing unit 114 senses the change of the operation direction, acquisition of the measured value by the acquisition unit 112 may be performed again from the sensing time point.

In particular, when the sensing unit 114 includes the IMU, the sensing unit 114 can also sense start of the operation from a resting state. In this case, in response to a state where the sensing unit 114 senses the operation start and the change in the operation direction, the acquisition unit 112 may be configured to acquire the measured value of the magnetic sensor 30 in the changed operation direction. Accordingly, the sensing unit 114 may output sensing results of the operation start and the change in the operation direction to the acquisition unit 112.

The sensing unit 114 may output the measured value of the magnetic sensor 30 and the reference information which are received from the acquisition unit 112 to the selection unit 116 in addition to the sensing result of the operation direction. It is noted however that the acquisition unit 112 may output the measured value of the magnetic sensor 30 and the reference information to the selection unit 116 directly without intermediation of the sensing unit 114.

The selection unit 116 selects the reference information to be used to estimate the position from reference information based on the measured value of each component of the magnetic field measured by at least one magnetic sensor 30 and at least one piece of reference information. The selection unit 116 derives a degree of coincidence between the combination of the X component and the Y component of the measured values measured by at least one magnetic sensor 30 and the combination of the coordinate values indicated by each of the curves 82 and 84 indicated by the first reference information and the second reference information. The selection unit 116 selects one of the first reference information or the second reference information which has the higher degree of coincidence with the combination of the X component and the Y component of the measured value out of the first reference information and the second reference information.

For example, the selection unit 116 derives a degree of coincidence based on a distance to the first line (the curve 82c) or the second line (the curve 84c) from predetermined coordinate values or coordinate values that a feature point selected by the user has among the measured values of the magnetic field measured by the magnetic sensor 30. The selection unit 116 may select the first reference information or the second reference information corresponding to a curve having a shorter distance out of the distances to the first line or the second line from the coordinate values of the feature point.

Alternatively, the selection unit 116 may perform the derivation of the degree of coincidence through a derivation by a total sum of least square distances between the plurality of measured values and the curve. According to the derived degree of coincidence, the selection unit 116 may select reference information with which the total sum of the least square distances becomes smaller as the reference information having the higher degree of coincidence out of the first reference information and the second reference information.

Note that when the first reference information and the second reference information are information indicating the combination of the measured values with regard to the components of the linearly independent three degrees of freedom in a three-dimensional space, the selection unit 116 performs a selection of the first reference information and the second reference information in the three-dimensional space. That is, according to the degree of coincidence between the combination of the components of the measured values in the first direction, the second direction, and the third direction of the magnetic field in the three-dimensional space and the figures indicated by the first reference information and the second reference information, the selection unit 116 selects one of the first reference information or the second reference information which has a higher degree of coincidence with the combination. The selection unit 116 transmits the measured value of the magnetic field of each component measured by the magnetic sensor 30 and the selected reference information to the estimation unit 118.

The estimation unit 118 estimates an angle of the second portion 12 with respect to the first portion 11 based on the combination of the measured values of each component of the magnetic field measured by the magnetic sensor 30 and the reference information indicating the combination of the measured values of each component measured by the magnetic sensor 30 which is selected by the selection unit 116. In the present embodiment, the estimation unit 118 estimates the angle θ indicating the attitude of the second portion 12 with respect to the first portion 11 based on the combination of the measured value of the X component and the measured value of the Y component which are measured by the magnetic sensor 30 and one of the first reference information or the second reference information selected by the selection unit 116.

Figure 8:
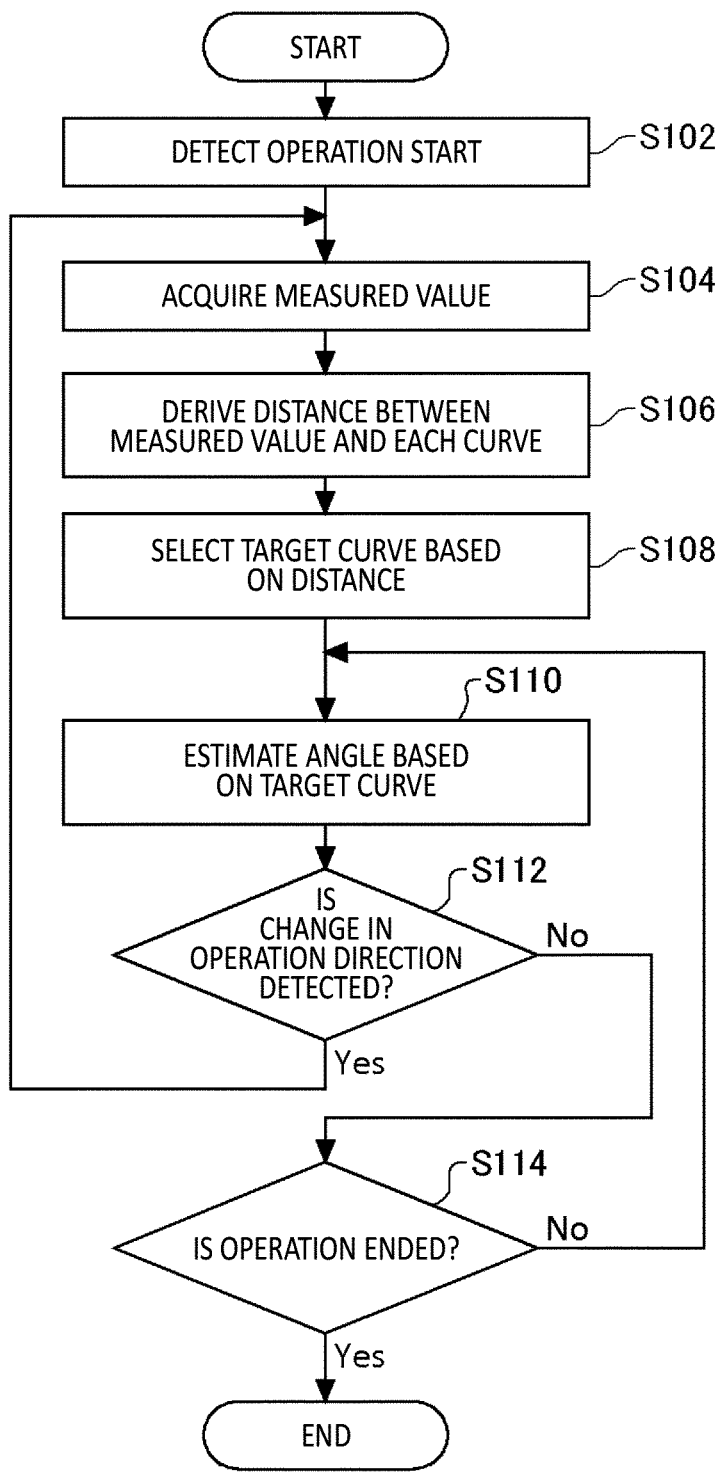
FIG. 8 illustrates an example of a flow diagram of an estimation method of the angle θ of the second portion 12 with respect to the first portion 11.

FIG. 8 illustrates an example of a flow diagram of an estimation method of the angle θ formed between the second portion 12 and the first portion 11. The estimation method includes each step from S102 to S114.

The sensing unit 114 detects operation start of the hinge mechanism 16 with which the attitude of the second portion 12 with respect to the first portion 11 is changed (S102). The acquisition unit 112 acquires a measured value of the magnetic field measured by at least one magnetic sensor 30 according to the angle θ corresponding to the attitude of the second portion 12 with respect to the first portion 11 in the operation direction (S104).

The selection unit 116 derives a distance between the combination of the coordinate values corresponding to the measured value measured by the magnetic sensor 30 and each of the curves (for example, the curves 82*c* and 84*c*) which are figures indicated by the reference information (S106). The selection unit 116 selects the curve having a highest degree of coincidence based on the degree of coincidence according to the derived distance (S108). The estimation unit 118 estimates the angle θ corresponding to the attitude of the second portion 12 with respect to the first portion 11 based on the measured value measured by the magnetic sensor 30 and the reference information indicating the target curve selected by the selection unit 116 (S110).

When the estimation of the angle θ is performed with respect to the series of measured values up to S110, the flow proceeds to determination on whether variation in the operation direction is sensed during the detection of the measured values. It is determined whether the sensing unit 114 detects whether the change in the operation direction of the second portion 12 with respect to the first portion 11 is a change in the operation direction at a given angle or more such as the reversal operation (S112). When the sensing unit 114 detects the change in the operation direction, the flow proceeds to S104 again, and the acquisition unit 102 acquires the measured value of the magnetic field of the magnetic sensor 30 in the operation direction. On the other hand, when the sensing unit 114 does not detect the change in the operation direction, the flow proceeds to S114, and it is determined whether the operation in which the angle θ formed between the second portion 12 and the first portion 11 is changed is ended.

For example, the sensing unit 114 including the IMU determines whether the operation for changing the angle θ formed by the second portion 12 with respect to the first portion 11 is ended (S114). When the operation end of the second portion 12 with respect to the first portion 11 is determined, the estimation method ends. On the other hand, when the operation end of the second portion 12 with respect to the first portion 11 is not determined, the flow returns to S110 again, and the estimation unit 118 may estimate the angle θ of the second portion 12 with respect to the first portion 11 at the time point.

By the estimation method including each step described above, the angle θ formed by the second portion 12 with respect to the first portion 11 is estimated. In accordance with the estimation method of the present embodiment, by using the plurality of pieces of reference information to estimate the angle, the estimation is performed in which the operation direction of the second portion 12 with respect to the first portion 11 corresponding to the reference information is segmentalized. With this configuration, the angle θ of the second portion 12 with respect to the first portion 11 is accurately estimated.

Figure 9:
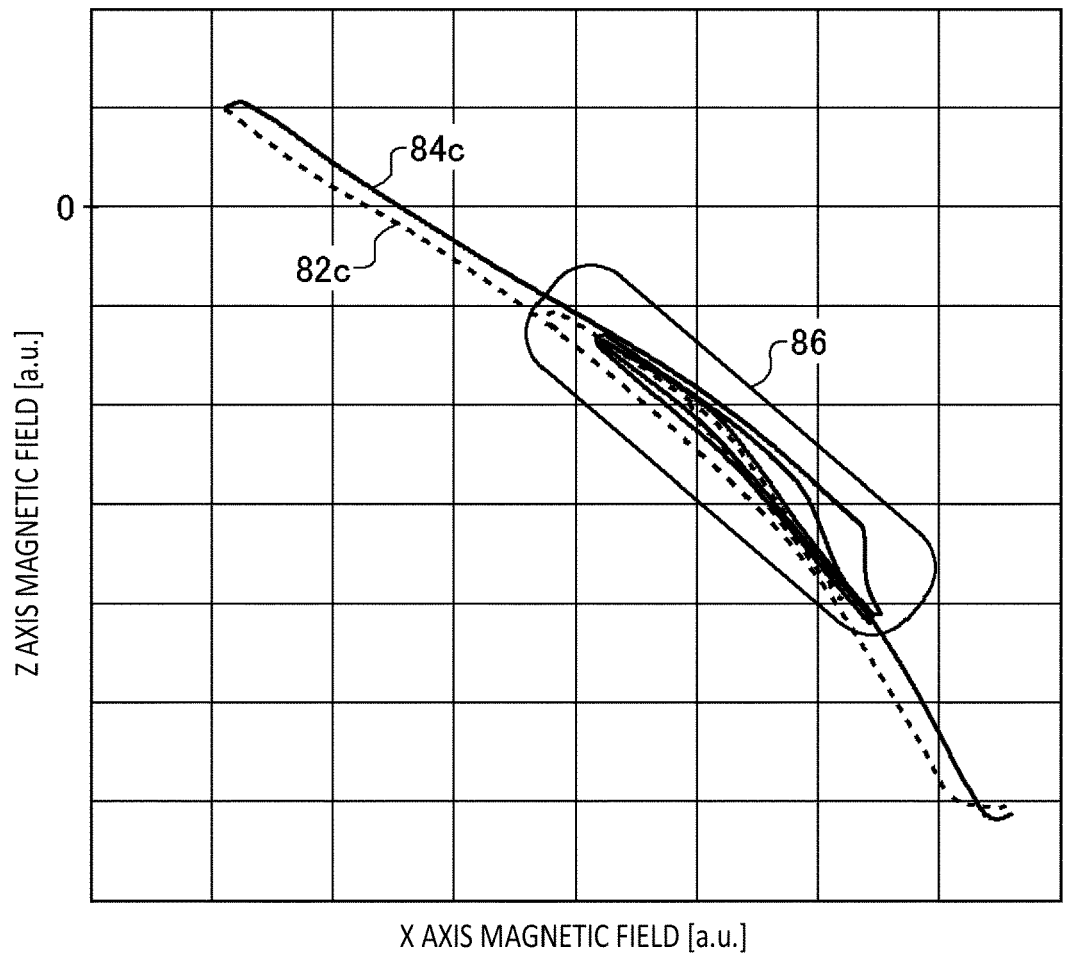
FIG. 9 illustrates an example of a measured value when reversal of opening and closing of the apparatus 10A is performed in a state where the angle θ between the first portion 11 and the second portion 12 is not reaching 0 degrees or 180 degrees.

FIG. 9 illustrates an example of a measured value when reversal of opening and closing of the apparatus 10A is performed in a state where the angle θ between the first portion 11 and the second portion 12 is not reaching 0 degrees or 180 degrees.

In the hinge mechanism 16, even when the angle θ of the second portion 12 with respect to the first portion 11 is at an angle other than 0 degrees or 180 degrees, the operation direction of opening and closing may be changed. In particular, when the apparatus 10A is a foldable smartphone, the hinge mechanism 16 may be a torque hinge which can maintain the angle θ at a desired angle from 0 degrees to 180 degrees. When such a torque hinge is used, the operation direction of the apparatus 10A easily reverses the direction of the opening and closing operations from any angle θ from 0 degrees to 180 degrees.

In this manner, the apparatus 10A may perform the reversal operation to the first attitude at the angle θ=0 degrees in the middle of the way of the first operation for changing the second portion 12 with respect to the first portion 11 from the first attitude corresponding to the angle θ=0 degrees (the closed state of the apparatus 10A) to the second attitude corresponding to the angle θ=180 degrees (the open state of the apparatus 10A). In the drawing, an example of the combination of the measured values of the X component and the Y component of the magnetic field when the apparatus 10A performs such a reversal operation is illustrated.

When the opening and closing operations are reversed in the middle of the way, the measured values measured by the magnetic sensor 30 may include a measured value group 86 that cannot be approximated by either the first reference information corresponding to the curve 82 or the second reference information corresponding to the curve 84. In order to accurately estimate the angle corresponding to the measured value in such a case, further reference information can be introduced.

Figure 10:
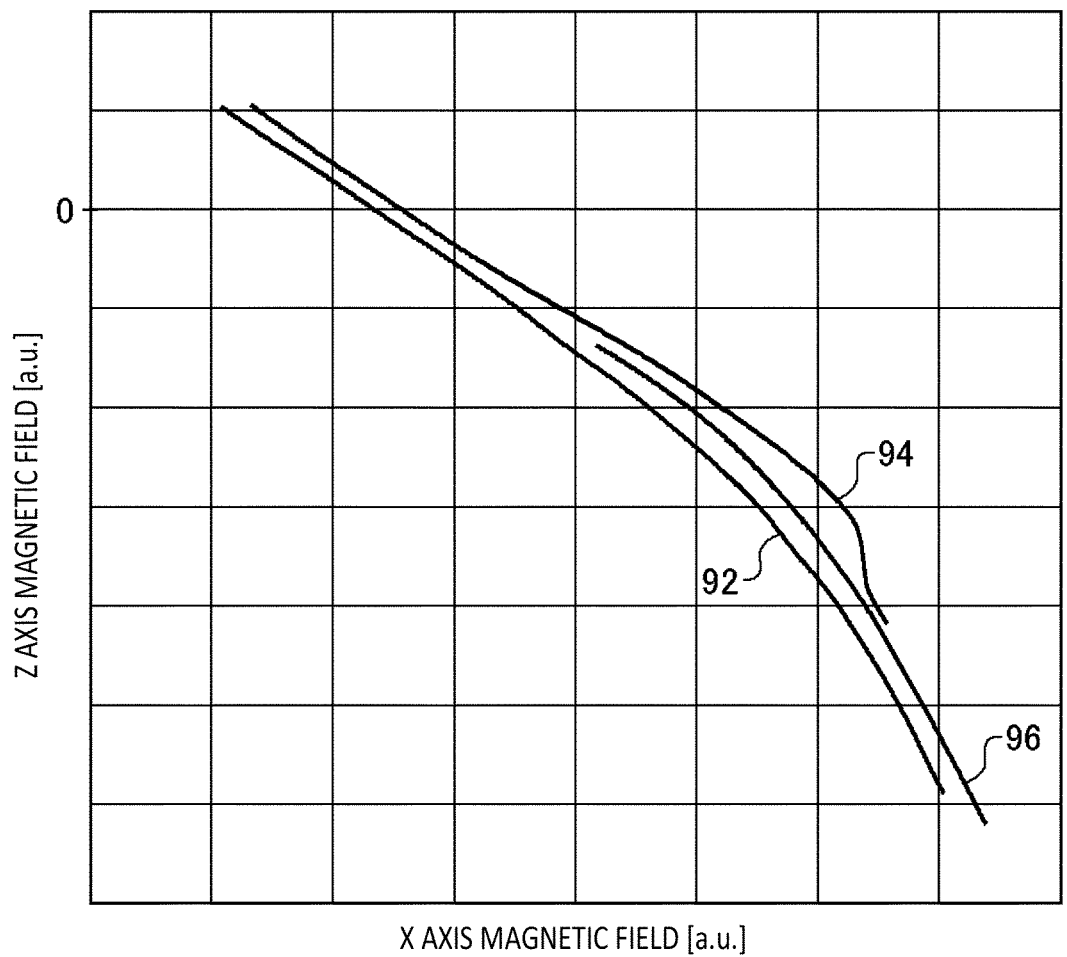
FIG. 10 illustrates an example of the first reference information, the second reference information, and third reference information.

FIG. 10 illustrates an example of the first reference information, the second reference information, and third reference information. The third reference information is reference information corresponding to a curve 96 in a case where the reversal operation is performed when the angle θ is at an angle halfway from 0 degrees to 180 degrees.

In the present embodiment, the angle θ of the second portion 12 with respect to the first portion 11 transitions from θ=0 degrees (the closed state of the apparatus 10A) to θ=180 degrees (the open state of the apparatus 10A) based on a curve 92. Furthermore, the angle θ of the second portion 12 with respect to the first portion 11 transitions to the operation from the angle θ=180 degrees towards the angle θ=0 degrees again (the closed state of the apparatus 10A) based on the curve 96. In the middle of the way of the change, the operation of the second portion 12 with respect to the first portion 11 reverses at a given angle θ (a predetermined angle: for example, the angle θ=130 degrees) on the curve 96 to return to a certain angle (for example, the angle θ=150 degrees) on the curve 96. The second portion 12 operates to the angle θ=0 degrees with respect to the first portion 11 based on a curve 94 from the angle again.

Herein, reference information related to a shape of the curve 92 corresponds to the first reference information, reference information related to a shape of the curve 94 corresponds to the second reference information, and reference information related to a shape of the curve 96 corresponds to the third reference information. Furthermore, the curve 92 corresponds to the first line, the curve 94 corresponds to the second line, and the curve 96 corresponds a third line. Accordingly, as being different from the embodiment of FIG. 7, in the present embodiment, the estimation apparatus 100 estimates the angle θ corresponding to the measured value by the first reference information to the third reference information which are related to the three curves 92, 94, and 96.

In this manner, the first reference information to the third reference information are indicated on the coordinate system in which the first axis represents the measured value of the X component of the magnetic field measured by the magnetic sensor 30 and the second axis represents the measured value of the component in the second direction measured by the magnetic sensor 30. The reference information is represented by the figure indicted by the set of the coordinate values corresponding to a position or an attitude of the second portion 12 with respect to the first portion 11 which is indicated by the combination of the measured value of the X component and the measured value of the Y component of the magnetic field measured by the magnetic sensor 30 on this coordinate system.

It is noted however that the first reference information to the third reference information may be the reference information indicating the combination of the coordinate values with regard to the components of the linearly independent three degrees of freedom among the magnetic flux densities measured by the magnetic sensor 30. For example, the three degrees of freedom may be degrees of freedom of (X, Y, Z) in the axial directions in the orthogonal coordinate system, may be degrees of freedom of (r, θ, z) of the cylindrical coordinate system, or may be (r, θ, φ) of the spherical coordinate system.

In the present embodiment, the control unit 110 of FIG. 3 may perform the following operation. Except for a point that the reference information includes the first reference information to the third reference information, the operation are common in the acquisition unit 112 as in a case where the reference information includes the first reference information and the second reference information.

When the attitude of the second portion 12 with respect to the first portion 11 is to be varied, in the middle of the way of the operation for varying the attitude, the sensing unit 114 detects whether the reversal operation for changing the operation direction occurs. A case where the third reference information is used is only a case where the reversal operation occurs. Accordingly, when the reversal operation of the apparatus 10A occurs, the sensing unit 114 senses the reversal operation, and the selection unit 116 selects the reference information again.

The selection unit 116 selects reference information to be used to estimate the position from the reference information based on the measured value of each component of the magnetic field measured by the at least one magnetic sensor 30 and at least one piece of reference information. The selection unit 116 derives a degree of coincidence between the combination of the X component and the Y component of the measured values measured by at least one magnetic sensor 30 and the combination of the coordinate values indicated by each of the curves 92, 94, and 96 indicated by the first reference information to the third reference information. The selection unit 116 selects one of the first reference information to the third reference information that has the highest degree of coincidence with the combination of the X component and the Y component of the measured value among the first reference information to the third reference information.

Note that when the first reference information to the third reference information are information indicating the combination of the measured values with regard to the components of the linearly independent three degrees of freedom in the three-dimensional space, the selection unit 116 performs a selection of the first reference information to the third reference information in the three-dimensional space. According to the degree of coincidence between the combination of the components of the measured values in the first direction, the second direction, and the third direction of the magnetic field in the three-dimensional space and the figures (the curves 92, 94, and 96) indicated by the first reference information to the third reference information, the selection unit 116 selects one of the first reference information to the third reference information that has the highest degree of coincidence with the combination. The selection unit 116 transmits the measured value of the magnetic field of each component measured by the magnetic sensor 30 and the selected reference information to the estimation unit 118.

The estimation unit 118 estimates the angle θ indicating the attitude of the second portion 12 with respect to the first portion 11 based on the combination of the measured value of the X component and the measured value of the Y component which are measured by the magnetic sensor 30 and one of the first reference information to the third reference information which is selected by the selection unit 116. As described above, even when the reversal operation for the operation is performed in the middle of the way of the operation in which the second portion 12 changes the attitude with respect to the first portion 11, the estimation apparatus 100A can accurately estimate the angle θ.

In the present embodiment, the example has been described in which the estimation unit 118 estimates the angle θ indicating the attitude of the second portion 12 with respect to the first portion 11 by using the combination of the measured value of the X component and the measured value of the Y component which are measured by the single magnetic sensor 30. However, when the apparatus 10A includes a plurality of magnetic sensors 30, the estimation unit 118 may estimate the angle θ indicating the attitude of the second portion 12 with respect to the first portion 11 by using the combination of the measured value of the X component measured by one magnetic sensor 30 among the plurality of magnetic sensors 30, and the measured value of the X component measured by another magnetic sensor 30 among the plurality of magnetic sensors 30. Alternatively, the estimation unit 118 may estimate the angle θ indicating the attitude of the second portion 12 with respect to the first portion 11 by using the combination of the measured value of the X component measured by one magnetic sensor 30 among the plurality of magnetic sensors 30, and the measured value of the Y component measured by another magnetic sensor 30 among the plurality of magnetic sensors 30.

Figure 11A:
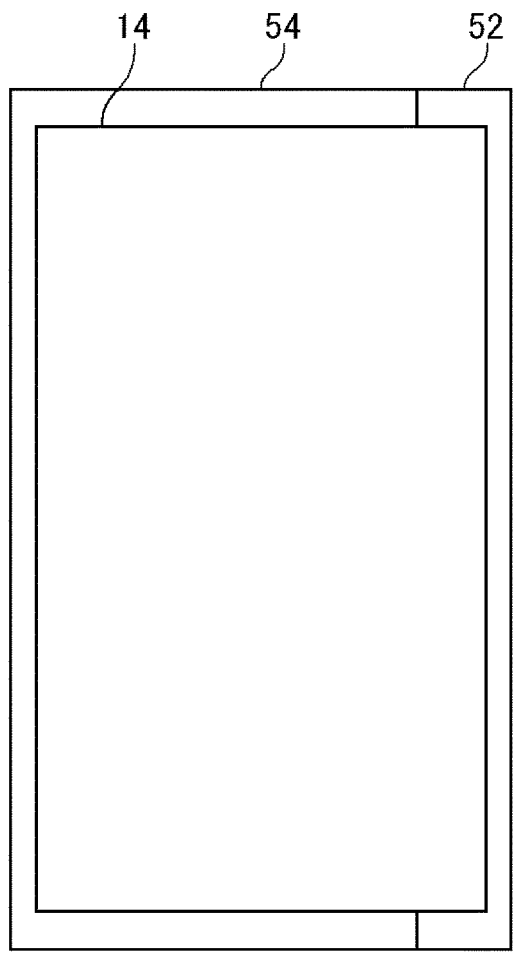
FIG. 11A illustrates an example of a top view of an external appearance in an apparatus 10B.
Figure 11B:
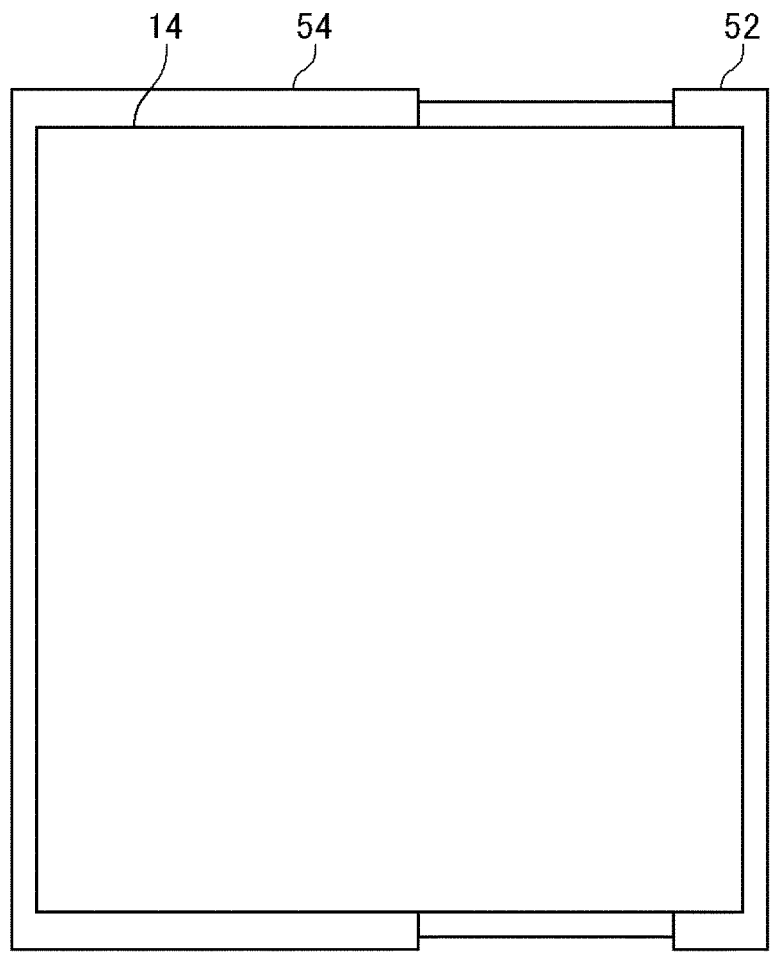
FIG. 11B illustrates another example of the top view of the external appearance in the apparatus 10B.
Figure 12:
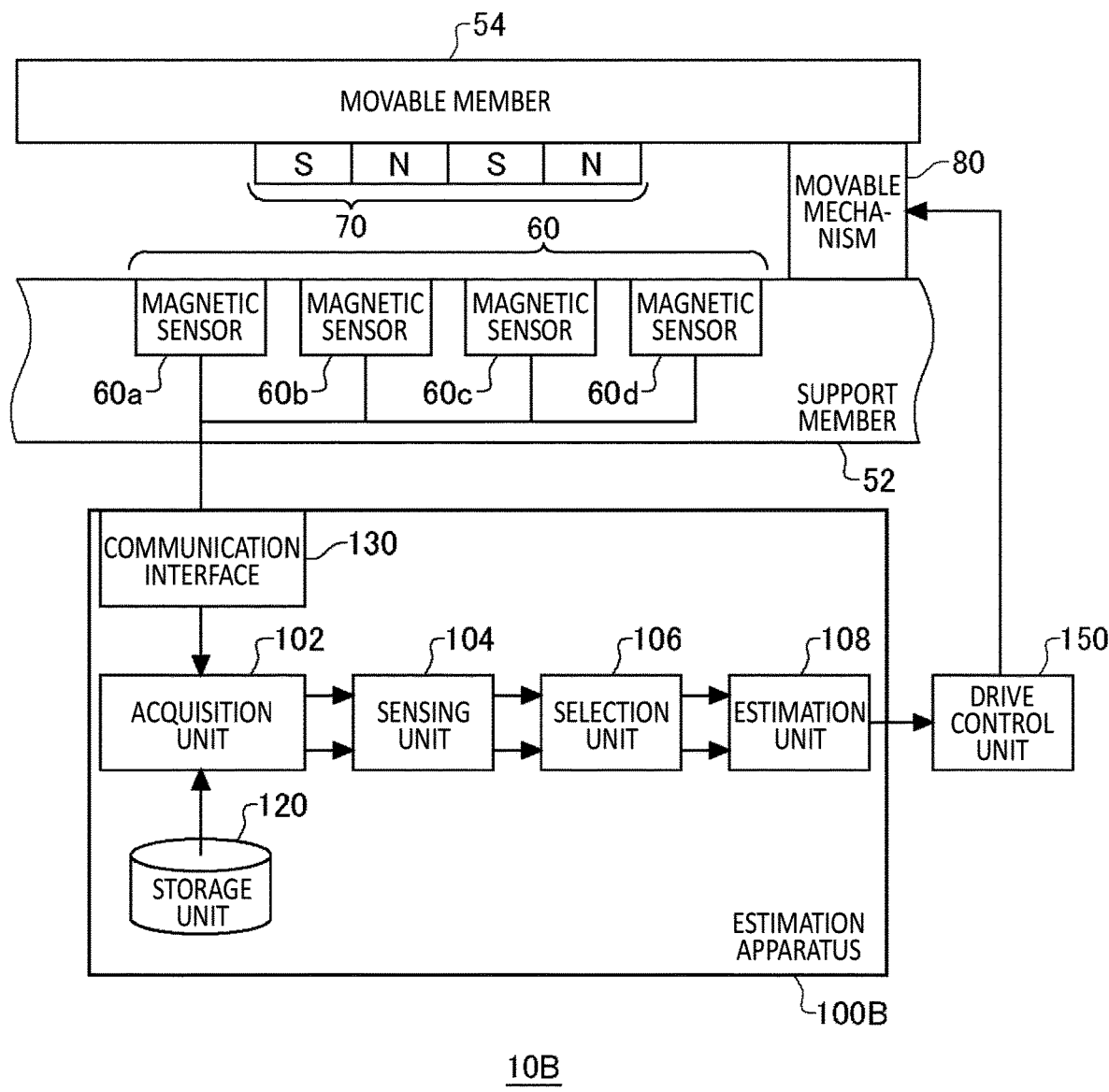
FIG. 12 illustrates an example of a functional block in the apparatus 10B according to the present embodiment.

Hereinafter, an embodiment will be described in which the apparatus 10 is an apparatus 10B that is an expandable terminal. With reference to FIG. 11A to FIG. 12, a configuration included in the apparatus 10B will be described. FIG. 11A illustrates an example of a top view of an external appearance of the apparatus 10B, and FIG. 11B illustrates another example of the top view of the external appearance of the apparatus 10B. FIG. 12 illustrates an example of a functional block of the apparatus 10B according to the present embodiment.

The apparatus 10B is an expandable terminal, and is a mobile terminal such as, for example, a smartphone, a mobile phone, a tablet, a laptop, and a small computer. FIG. 11A and FIG. 11B illustrate an example in which the apparatus 10B is a so-called rollable smartphone. The apparatus 10B includes a support member 52, a movable member 54, the display 14, and a movable mechanism 80.

As illustrated in FIG. 11A and FIG. 11B, for example, a display screen of the display 14 the apparatus 10B extends and contracts. The support member 52 and the movable member 54 may configure a display unit. The movable member 54 may move along an X axis direction from a first state illustrated in FIG. 11A to a second state illustrated in FIG. 11B with respect to the support member 52. With this configuration, a width in an X direction of the display screen of the display 14 extends and contracts. The display 14 may be, for example, a thin display such as an organic EL display that is allowed to be wound around a rotational axis along the Y axis when the movable mechanism 80 functions. The support member 52 is an example of a "first portion", and the movable member 54 is an example of a "second portion".

The movable mechanism 80 may have a driving source that provides a driving force to move the movable member 54 with respect to the support member 52. The driving source may be an electrostatic actuator, a voice coil motor (VCM), or an actuator such as a piezo actuator. A configuration may be adopted where the movable mechanism 80 does not have a driving source, and the movable member 54 may be moved manually via the movable mechanism 80 with respect to the support member 52.

Note that in the present embodiment, for ease of the description, the example has been illustrated in which the apparatus 10 has any of the hinge mechanism 16 or the movable mechanism 80, but the apparatus 10 may have both the hinge mechanism 16 and the movable mechanism 80. That is, the apparatus 10 may be, for example, a collapsible and expandable terminal like a smartphone using a slider hinge mechanism. Accordingly, the embodiment or part thereof with regard to the collapsible terminal described with reference to FIG. 1A to FIG. 10 may be combined with an embodiment or part thereof with regard to the expandable terminal described with reference to FIG. 11A and subsequent drawings. The embodiment described below can be applied to the measured value with respect to the translational movement and the rotational movement in a plurality of axial directions in an XYZ space of the movable member 54 with respect to the support member 52.

FIG. 11A illustrates a state in which the movable member 54 is most shortened with respect to the support member 52 in a movable range of the movable member. This is an example of a state in which the movable member 54 is in a "first position" with respect to the support member 52. Furthermore, FIG. 11B illustrates a state in which the movable member 54 is most extended with respect to the support member 52 in the movable range of the movable member. This is an example of a state in which the movable member 54 is in a "second position" with respect to the support member 52.

In this case, an operation for putting the movable member 54 from the "first position" into the "second position" with respect to the support member 52, that is, from the most shortened state into the most extended state is an example of the "first operation". On the other hand, an operation for putting the movable member 54 from the "second position" into the "first position" with respect to the support member 52, that is, from the most extended state into the most shortened state is an example of the "second operation".

As illustrated in FIG. 12, the apparatus 10B further includes a plurality of magnetic sensors 60a and 60b (which may be hereinafter collectively referred to as a magnetic sensor 60) and a magnet section 70. Similarly as in the magnetic sensor 30, the magnetic sensor 60 measures a magnetic field in a position in which the magnetic sensor 60 is provided, and outputs a measured value (for example, a voltage or a current) according to the magnetic field. The magnetic sensor 60 may be a Hall element.

In the present embodiment, an example will be described in which the apparatus 10B includes a plurality of magnetic sensors 60. The plurality of magnetic sensors 60 includes magnetic sensors 60a and 60b. The number of magnetic sensors 60 included in the apparatus 10B is optional, and it suffices when the apparatus 10B includes at least two magnetic sensors 60. It suffices when the apparatus 10B includes a required number of magnetic sensors 60 to estimate a position or an attitude of the movable member 54 with respect to the support member 52 in an entire movable range. The magnetic sensor 60 may output the measured value according to each magnetic field in the directions of the X axis, the Y axis, and the Z axis. However, to simplify the description in the present embodiment, the description will be provided where focus is on any one axis of the X axis, the Y axis, or the Z axis, for example, the measured value according to the magnetic field in the X axis direction. The magnetic sensor 60a is an example of a "first magnetic sensor", and the magnetic sensor 60b is an example of a "second magnetic sensor".

The magnet section 70 is configured to provide a magnetic field for each of the plurality of magnetic sensors 60. When the movable member 54 moves with respect to the support member 52, the magnet section 70 may have an S pole and an N pole alternately arranged along a predetermined direction in the movable member 54.

In this case, the plurality of magnetic sensors 60 may be provided in the support member 52 that is one of the support member 52 or the movable member 54, and the magnet section 70 may be provided in the movable member 54 that is another of the support member 52 or the movable member 54. It is noted however which of the plurality of magnetic sensors 60 or the magnet section 70 is provided in the support member 52 or the movable member 54 is not limited to this example, and it suffices when the plurality of magnetic sensor 60 can detect a relative position of the support member 52 or the movable member 54. Accordingly, the magnetic sensor 60 may be provided in the movable member 54, and the magnet section 70 may be provided in the support member 52.

When the movable member 54 moves along a predetermined direction with respect to the support member 52, the plurality of magnetic sensors 60 may be provided in the support member 52 along the predetermined direction. The plurality of magnetic sensors 60 may be provided in the support member 52 at an equal interval along the predetermined direction.

The apparatus 10B further includes an estimation apparatus 100B and a drive control unit 150. The estimation apparatus 100B estimates a position of the movable member 54 with respect to the support member 52 based on the measured value of each of the plurality of magnetic sensors 60. The drive control unit 150 may control the movable mechanism 80 based on the position of the movable member 54 with respect to the support member 52 which is estimated by the estimation apparatus 100B such that the position of the movable member 54 with respect to the support member 52 is to be in a target position.

The plurality of magnetic sensors 60 is configured to measure the surrounding magnetic field, and output the measured value indicating the magnitude of the surrounding magnetic field. The movable member 54 moves with respect to the support member 52, so that the surrounding magnetic field of each of the plurality of magnetic sensors 60 is varied. Accordingly, when a relationship between the measured value of each of the plurality of magnetic sensors 60 and the movable member 54 with respect to the support member 52 is found in advance, the estimation apparatus 100B can estimate the position of the movable member 54 with respect to the support member 52 from the measured value measured by each of the plurality of magnetic sensors 60.

Then, an internal configuration and functionality of an estimation apparatus 100B will be described. The estimation apparatus 100B includes the communication interface 130, the storage unit 120, the acquisition unit 102, a sensing unit 104, a selection unit 106, and an estimation unit 108. The estimation apparatus 100B may be configured by a computer including a CPU and a memory. The CPU may function as the acquisition unit 102, the sensing unit 104, the selection unit 106, and the estimation unit 108, and the memory may function as the storage unit 120.

The communication interface 130 communicates with a plurality of magnetic sensors 60 via a signal line, and receives measured values of the magnetic flux densities measured by the plurality of magnetic sensors 60. The communication interface 130 may receive each component in the XYZ coordinate system of the magnetic flux densities measured by the plurality of magnetic sensors 60.

The storage unit 120 stores the reference information for estimating the position of the movable member 54 with respect to the support member 52 from the measured values in the plurality of magnetic sensors 60 including the magnetic sensors 60a and 60b. The reference information includes the first reference information indicating the combination of the measured values of the X components of the magnetic fields measured by the plurality of magnetic sensors 60 in the first operation for moving the movable member 54 with respect to the support member 52 from the first position to the second position. In the first reference information, the plurality of magnetic sensors 60 with which the combination of the X components of the magnetic fields is indicated is, for example, the magnetic sensors 60a and 60b. It is noted however that in the first reference information, the plurality of magnetic sensors 60 with which the combination of the X components of the magnetic fields is indicated may include other magnetic sensors (magnetic sensors 60c, 60d, and the like).

The reference information further includes the second reference information indicating the combination of the measured values of the X components of the magnetic fields measured by the plurality of magnetic sensors 60 in the second operation for moving the movable member 54 with respect to the support member 52 from the second position to the first position. In the second reference information, the plurality of magnetic sensors 60 with which the combination of the X components of the magnetic fields is indicated is, for example, the magnetic sensors 60a and 60b. It is noted however that in the second reference information, the plurality of magnetic sensors 60 with which the combination of the X components of the magnetic fields may include another magnetic sensor.

The reference information is, for example, in part of a detection range of the magnetic sensors 60a and 60b, a function indicating the combination of the measured values measured by the magnetic sensors 60a and 60b in the range. For example, the reference information may be the first reference information and the second reference information, and may include functions with different coefficients. Furthermore, at the time of the reversal operation for causing the movable member 54 (the second portion 12), in the middle of the way of the change from the first position to the second position with respect to the support member 52 (the first portion 11) to return to the first position, the reference information may include the third reference information corresponding to a function having a more fitting coefficient. In addition, according to coefficients corresponding to the first reference information to the third reference information, the reference information may be a figure of a curve indicated by the combination of the measured values of the plurality of magnetic sensors 60a and 60b.

The acquisition unit 102 receives the measured values of the magnetic flux densities (or the magnetic fields) measured by the plurality of magnetic sensors 60 from the communication interface 130, and acquires the reference information from the storage unit 120. The acquisition unit 102 transmits the acquired measured values of the plurality of magnetic sensors 60 and one or more reference information to the sensing unit 104.

The sensing unit 104 senses a change in a moving direction of the movable member 54 with respect to support member 52 based on the measured values of the plurality of magnetic sensors 60. Specifically, the sensing unit 104 may sense a change in the operation direction based on a change of signs of the acceleration in the X direction.

The selection unit 106 selects the reference information to be used to estimate the position from one or more reference information based on the measured value and one or more reference information. The selection unit 106 selects the reference information to be used to estimate a relative position of the movable member 54 with respect to the support member 52 in the X axis from the first reference information and the second reference information, for example. With regard to the reference information, for example, based on the plurality of measured values of the X components of the magnetic fields measured by the first magnetic sensors 60a and 60b, the selection unit 106 selects the reference information which gives a function with a high degree of coincidence out of the first reference information and the second reference information indicating the combination of the measured values.

In addition, in response to a state where the sensing unit 104 senses the reversal operation, the selection unit 106 may select the fitting reference information again. For example, based on the degree of coincidence between the plurality of measured values of the X components of the magnetic fields measured by the first magnetic sensors 60a and 60b and each of the first reference information, the second reference information, and the third reference information, the selection unit 106 selects the reference information to be used to estimate the position from among the first reference information, the second reference information, and the third reference information. According to the coefficients that the functions have which are given by the first reference information, the second reference information, and the third reference information, the selection unit 106 may select the reference information by the degree of coincidence between the figure of the curve indicated by the combination of the measured values of the plurality of magnetic sensors 60a and 60b and the curve indicated by the combination of the measured values actually measured by the magnetic sensors 60a and 60b. The selection unit 106 transmits the measured value of the X component measured by the plurality of magnetic sensors 60 and the selected reference information to the estimation unit 108.

The estimation unit 108 estimates a position of the movable member 54 (the second portion 12) in the X direction with respect to the support member 52 (the first portion 11) based on the combination of the measured values of the X component measured by the plurality of magnetic sensors 60 and the reference information indicating the combination of the measured values of the X component measured by the plurality of magnetic sensors 60 which is selected by the selection unit 106.

As described above, the estimation apparatus 100B performs the estimation of the position by using the plurality of pieces of reference information segmentalized based on the operation direction or the like with respect to the combination of the measured values of the X component measured by the plurality of magnetic sensors 60. With this configuration, even if the operation direction is varied when the operation is performed in which the second portion 12 changes the position with respect to the first portion 11, the estimation apparatus 100B can accurately estimate the position of the second portion 12 with respect to the first portion 11.

In the present embodiment, the example has been described in which the estimation unit 108 estimates the position of the movable member 54 with respect to the support member 52 by using the combination of the measured value of the X components of the respective magnetic fields measured by the magnetic sensors 60a and 60b. However, the estimation unit 108 may estimate the position of the movable member 54 with respect to the support member 52 by using the combination of the measured values in different axial directions of the magnetic fields measured by the plurality of magnetic sensors 60. For example, the estimation unit 108 may estimate the position of the movable member 54 with respect to the support member 52 by using the combination of the measured value of the X component of the magnetic field measured by the magnetic sensor 60a and the measured value of the Y component of the magnetic field measured by the magnetic sensor 60a. The estimation unit 108 may estimate the position of the movable member 54 with respect to the support member 52 by using the combination of the measured value of the X component and the measured value of the Y component of the magnetic field measured by the single magnetic sensor 60a.

The apparatus 10B may include a plurality of magnetic sensors 60 for each of a plurality of axes for translational movement of the movable member 54 with respect to the support member 52. For example, by combining a plurality of slide mechanisms, after the movable member 54 is pulled out with respect to the support member 52, the apparatus 10B may be an apparatus which can change the relationship for overlapping the movable members 54 or arranging the movable member 54 in a planar positional relationship with respect to the support member 52. Since the apparatus 10B is provided with the plurality of magnetic sensors 60, it is facilitated for the estimation unit 108 to estimate the exact position with regard to the translational movement in the XYZ space of the movable member 54 with respect to the support member 52.

Figure 13:
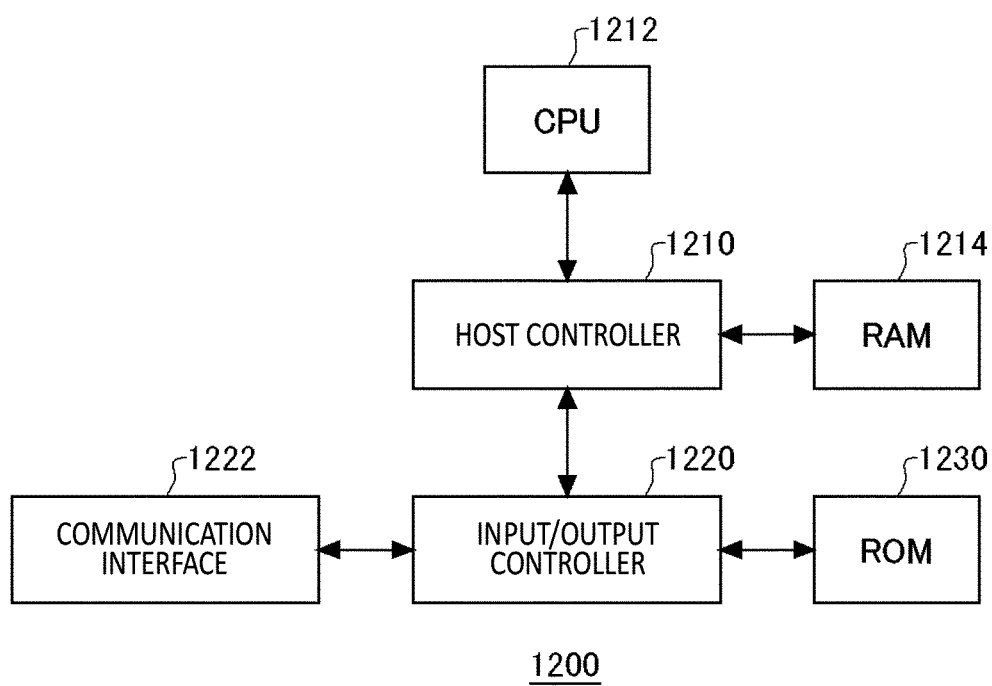
FIG. 13 illustrates an example of a hardware configuration in which a plurality of aspects of the present invention are embodied.

FIG. 13 illustrates an example of a computer 1200 where a plurality of aspects of the present invention may be entirely or partially embodied. Programs installed in the computer 1200 can cause the computer 1200 to function as operations associated with the apparatus according to the embodiments of the present invention or one or more "units" of the apparatuses. Alternatively, the programs can cause the computer 1200 to execute the operations or the one or more "units". The programs can cause the computer 1200 to execute a process according to the embodiments of the present invention or steps of the process. Such programs may be executed by a CPU 1212 to cause the computer 1200 to perform specific operations associated with some or all of the blocks in the flowcharts and block diagrams described in the present specification.

The computer 1200 according to the present embodiment includes the CPU 1212 and a RAM 1214, which are mutually connected by a host controller 1210. The computer 1200 also includes a communication interface 1222 and an input/output unit, which are connected to the host controller 1210 via an input/output controller 1220. The computer 1200 also includes a ROM 1230. The CPU 1212 operates according to the programs stored in the ROM 1230 and the RAM 1214, thereby controlling each unit.

The communication interface 1222 communicates with other electronic devices via a network. A hard disk drive may store the programs and data used by the CPU 1212 in the computer 1200. The ROM 1230 stores therein boot programs or the like executed by the computer 1200 at the time of activation, and/or stores programs depending on hardware of the computer 1200. The programs are provided via a computer readable storage medium such as CR-ROM, a USB memory or an IC Card or a network. The programs are installed on the RAM 1214, which also is an example of the computer readable storage medium, or the ROM 1230 and performed by the CPU 1212. Information processing written in these programs is read by the computer 1200, and provides cooperation between the programs and the various types of hardware resources described above. An apparatus or a method may be configured by implementing operations or processing of information according to a use of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a medium such as the RAM 1214 or a USB memory and transmits the read transmission data to a network or writes reception data received from a network to a reception buffer region or the like provided on the storage medium.

Also, the CPU 1212 may cause the whole or required part of files which are stored in the external storage media (such as USB memory) or the database to be read by the RAM 1214, to perform a various type of processes for the data on the RAM 1214. Then, the CPU 1212 may write back the processed data to the external storage media.

A various type of information such as a various type of programs, data, tables and databases may be stored in a storage media to undergo an information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. Also, the CPU 1212 may retrieve information in the file, database or the like in the storage media. For example, when a plurality of entries each having an attribute value of the first attribute associated with an attribute value of the second attribute are stored in a storage media, the CPU 1212 may retrieve, among the plurality of entries, an entry whose attribute value of the first attribute is specified and matches the conditions and read the attribute value of the second attribute stored in the entry, thereby acquiring the attribute value of the second attribute associated with the first attribute which satisfies a predetermined condition.

The programs or software module described above may be stored on the computer 1200 or in a computer readable storage medium near the computer 1200. In addition, a storage medium such as a hard disk or a RAM provided in a server system connected in a wired or wireless manner to a dedicated communication network or the Internet can be used as the computer readable storage medium, thereby providing the program to the computer 1200 via the network.

A computer readable medium may include any tangible device that can store instructions to be executed by a suitable device. As a result, the computer readable medium having instructions stored therein includes an article of manufacture including instructions which can be executed in order to create means for performing operations specified in the flowcharts or block diagrams. Examples of the computer readable medium may include an electronic storage medium, a magnetic storage medium, an optical storage medium, an electromagnetic storage medium, a semiconductor storage medium, and the like. More specific examples of the computer readable medium may include a floppy disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

A computer readable instruction may include either a source code or an object code described in any combination of one or more programming languages. The source code or the object code includes a conventional procedural programming language. The conventional procedural programming language may be assembler instructions, instruction-set-architecture (ISA) instructions, machine instructions, machine dependent instructions, microcode, firmware instructions, state-setting data, or an object oriented programming language such as Smalltalk (registered trademark), JAVA (registered trademark), C++, etc., and programming languages, such as the "C" programming language or similar programming languages. Computer readable instructions may be provided to a processor of a general purpose computer, special purpose computer, or other programmable data processing device, or to programmable circuitry, locally or via a local area network (LAN), a wide area network (WAN) such as the Internet, etc. The processor or the programmable circuitry may execute the computer readable instructions in order to create means for performing operations specified in the flowcharts or block diagrams. Examples of the processor include a computer processor, a processing unit, a microprocessor, a digital signal processor, a controller, a microcontroller, and the like.

While the present invention has been described above by using the embodiments, the technical scope of the present invention is not limited to the scope of the above described embodiments. It is apparent to persons skilled in the art that various alterations or improvements can be made to the above described embodiments. It is also apparent from description of the claims that the embodiments to which such alterations or improvements are made can be included in the technical scope of the present invention.

It should be noted that the operations, procedures, steps, stages, etc. of each process performed by an apparatus, system, program, and method illustrated in the claims, specification, or diagrams can be performed in any order as long as the order is not indicated by "prior to," "before," or the like and as long as the output from a previous process is not used in a later process. Even if the operational flow is described by using phrases such as "first" or "next" in the claims, specification, or diagrams, it does not necessarily mean that the process must be performed in this order.

EXPLANATION OF REFERENCES

10: apparatus;
11: first portion;
12: second portion;
14: display;
16: hinge mechanism;
18: rotational axis;
20, 70: magnet section;
30, 60: magnetic sensor;
52: support member;
54: movable member;
80: movable mechanism;
82, 84, 92, 94, 96: curve;
86: measured value group;
100: estimation apparatus;
102, 112: acquisition unit;
104, 114: sensing unit;
106, 116: selection unit;
108, 118: estimation unit;
110: control unit;
120: storage unit;
130, 1222: communication interface;
150: drive control unit;
1200: computer;
1210: host controller;
1212: CPU;
1214: RAM;
1220: input/output controller;
1230: ROM.

What is claimed is:

1. An estimation apparatus for estimating at least one of a position or an attitude of a second portion with respect to a first portion in an apparatus including the first portion, the second portion, a movable mechanism which allows a first operation for causing the second portion to change from a first position or a first attitude to a second position or a second attitude with respect to the first portion and a second operation for causing the second portion to change from the second position or the second attitude to the first position or the first attitude with respect to the first portion, at least one magnetic sensor provided in one of the first portion or the second portion, and a magnet section which is provided in another of the first portion or the second portion and which provides a magnetic field measured by the at least one magnetic sensor, the estimation apparatus comprising:

an estimation unit which performs, based on a combination of measured values of at least two components in at least one direction measured by the at least one magnetic sensor at a first time point and reference information indicating measured values of at least two components in at least one direction measured by the at least one magnetic sensor according to a position or an attitude of the second portion with respect to the first portion, an estimation of a position or an attitude of the second portion with respect to the first portion at the first time point, wherein the reference information includes first reference information indicating the measured values of the at least two components in the at least one direction measured by the at least one magnetic sensor according to the position or the attitude of the second portion with respect to the first portion during the first operation, and second reference information indicating the measured values of the at least two components in the at least one direction measured by the at least one magnetic sensor according to the position or the attitude of the second portion with respect to the first portion during the second operation, the estimation apparatus further comprising:
a selection unit which selects, according to a degree of coincidence between the combination of the measured values of the at least two components in the at least one direction measured by the at least one magnetic sensor and each of the first reference information and the second reference information, one of the first reference information or the second reference information which has a higher degree of coincidence with the combination as the reference information used for the estimation by the estimation unit.

2. The estimation apparatus according to claim 1, wherein the movable mechanism allows a reversal operation for causing the second portion, in a middle of a way of change from the first position or the first attitude to the second position or the second attitude with respect to the first portion, to return to the first position or the first attitude,
the reference information further includes third reference information indicating the measured values of the at least two components in the at least one direction measured by the at least one magnetic sensor according to the position or the attitude of the second portion with respect to the first portion during the reversal operation, and
the selection unit selects, based on a degree of coincidence between the combination of the measured values of the at least two components in the at least one direction measured by the at least one magnetic sensor and each of the first reference information, the second reference information, and the third reference information, one of the first reference information, the second reference information, or the third reference information as the reference information used for the estimation of the position or the attitude of the second portion with respect to the first portion by the estimation unit.

3. The estimation apparatus according to claim 2, wherein the selection unit selects, based on a degree of coincidence between the combination of the measured values of the at least two components in the at least one direction measured by the at least one magnetic sensor and each of the first reference information, the second reference information, and the third reference information, one of the first reference information, the second reference information, or the third reference information that has a highest degree of coincidence with the combination.

4. The estimation apparatus according to claim 1, wherein the first reference information indicates a combination between a measured value of the component in a first direction and a measured value of a component in a second direction which are measured by the at least one magnetic sensor according to the position or the attitude of the second portion with respect to the first portion during the first operation,
the second reference information indicates the measured value of the component in the first direction and the measured value of the component in the second direction which are measured by the at least one magnetic sensor according to the position or the attitude of the second portion with respect to the first portion during the second operation, and
the measured value of the component in the first direction and the measured value of the component in the second direction which are measured by the at least one magnetic sensor indicate a combination of the measured value of the component in the first direction and the measured value of the component in the second direction which are measured by the at least one magnetic sensor according to the attitude.

5. The estimation apparatus according to claim 4, wherein the first reference information indicates a combination of the measured value of the component in the first direction, the measured value of the component in the second direction, and a measured value of a component in a third direction which are measured by the at least one magnetic sensor according to the position or the attitude of the second portion with respect to the first portion during the first operation,
the second reference information indicates a combination of the measured value of the component in the first direction, the measured value of the component in the second direction, and the measured value of the component in the third direction which are measured by the at least one magnetic sensor according to the position or the attitude of the second portion with respect to the first portion during the second operation, and
the selection unit selects, according to a degree of coincidence between the combination of the measured value of the component in the first direction, the measured value of the component in the second direction, and the measured value of the component in the third direction which are measured by the at least one magnetic sensor and each of the first reference information and the second reference information, one of the first reference information or the second reference information which has the higher degree of coincidence with the combination.

6. The estimation apparatus according to claim 1, wherein the selection unit selects, according to a degree of coincidence between each of a plurality of combinations of the measured values of the at least two components in the at least one direction measured by the at least one magnetic sensor and each of the first reference information and the second reference information, one of the first reference information or the second reference information which has the higher degree of coincidence with each of the plurality of combinations.

7. The estimation apparatus according to claim 1, wherein the reference information is represented by a figure, on a coordinate system in which a first axis represents the measured value of the component in a first direction measured by the at least one magnetic sensor and a second axis represents the measured value of the component in a second direction measured by the at least one magnetic sensor or a first axis represents the measured value of the component in the first direction measured by a first magnetic sensor of the at least one magnetic sensor and a second axis represents the measured value of the component in the first direction measured by a second magnetic sensor of the at least one magnetic sensor, which is indicated by a set of coordinate values corresponding to the position or the attitude of the second portion with respect to the first portion indicated by a combination of the measured value of the component in the first direction and the measured value of the component in the second direction which are measured by the at least one magnetic sensor or a combination of the measured value of the component in the first direction measured by the first magnetic sensor and the measured value of the component in the first direction measured by the second magnetic sensor, the figure includes a first line corresponding to the first reference information and a second line corresponding to the second reference information, and the selection unit selects, according to a distance between the coordinate values on the coordinate system corresponding to the combination of the measured value of the component in the first direction and the measured value of the component in the second direction which are measured by the at least one magnetic sensor or the combination of the measured value of the component in the first direction measured by the first magnetic sensor and the measured value of the component in the first direction measured by the second magnetic sensor, and each of the first line and the second line, one of the first reference information or the second reference information that has a shorter distance to the coordinate values.

8. The estimation apparatus according to claim 2, wherein the reference information is represented by a figure, on a coordinate system in which a first axis represents the measured value of the component in a first direction measured by the at least one magnetic sensor and a second axis represents the measured value of the component in a second direction measured by the at least one magnetic sensor or a first axis represents the measured value of the component in the first direction measured by a first magnetic sensor of the at least one magnetic sensor and a second axis represents the measured value of the component in the first direction measured by a second magnetic sensor of the at least one magnetic sensor, which is indicated by a set of coordinate values corresponding to the position or the attitude of the second portion with respect to the first portion indicated by a combination of the measured value of the component in the first direction and the measured value of the component in the second direction which are measured by the at least one magnetic sensor or a combination of the measured value of the component in the first direction measured by the first magnetic sensor and the measured value of the component in the first direction measured by the second magnetic sensor, the figure includes a first line corresponding to the first reference information, a second line corresponding to the second reference information, and a third line corresponding to the third reference information, the estimation apparatus further comprises:

a sensing unit which senses the reversal operation for causing the second portion, in the middle of the way of change from the first position or the first attitude to the second position or the second attitude with respect to the first portion, to return to the first position or the first attitude, and when the sensing unit senses the reversal operation, the selection unit selects one of the first reference information, the second reference information, or the third reference information based on a distance between the coordinate values on the coordinate system corresponding to the combination of the measured value of the component in the first direction and the measured value of the component in the second direction which are measured by the at least one magnetic sensor or the combination of the measured value of the component in the first direction measured by the first magnetic sensor and the measured value of the component in the first direction measured by the second magnetic sensor, and each of the first line, the second line, and the third line.

9. The estimation apparatus according to claim 8, wherein the selection unit selects, based on a distance between the coordinate values on the coordinate system corresponding to the combination of the measured value of the component in the first direction and the measured value of the component in the second direction which are measured by the at least one magnetic sensor or the combination of the measured value of the component in the first direction measured by the first magnetic sensor and the measured value of the component in the first direction measured by the second magnetic sensor, and each of the first line, the second line, and the third line, one of the first reference information, the second reference information, or the third reference information that has a shortest distance to the coordinate values.

10. An apparatus comprising:
the estimation apparatus according to claim 1;
the first portion;
the second portion; and
the movable mechanism.

11. An estimation method of estimating at least one of a position or an attitude of a second portion with respect to a first portion in an apparatus including the first portion, the second portion, a movable mechanism which allows a first operation for causing the second portion to change from a first position or a first attitude to a second position or a second attitude with respect to the first portion and a second operation for causing the second portion to change from the second position or the second attitude to the first position or the first attitude with respect to the first portion, at least one magnetic sensor provided in one of the first portion or the second portion, and a magnet section which is provided in another of the first portion or the second portion and which provides a magnetic field measured by the at least one magnetic sensor, the estimation method comprising:

performing, based on a combination of measured values of at least two components in at least one direction measured by the at least one magnetic sensor at a first time point and reference information indicating measured values of at least two components in at least one direction measured by the at least one magnetic sensor according to a position or an attitude of the second portion with respect to the first portion, an estimation of a position or an attitude of the second portion with respect to the first portion at the first time point, wherein the reference information includes first reference information indicating the measured values of the at least two components in the at least one direction measured by the at least one magnetic sensor according to the position or the attitude of the second portion with respect to the first portion during the first operation, and second reference information indicating the measured values of the at least two components in at least one direction measured by the at least one magnetic sensor according to the position or the attitude of the second portion with respect to the first portion during the second operation, the estimation method further comprising:

selecting, according to a degree of coincidence between the combination of the measured values of the at least two components in the at least one direction measured by the at least one magnetic sensor and each of the first reference information and the second reference information, one of the first reference information or the second reference information which has a higher degree of coincidence with the combination as the reference information used for the estimation of the position or the attitude of the second portion with respect to the first portion in the performing the estimation.

12. A computer readable storage medium storing a program for causing a computer to function as an estimation apparatus for estimating at least one of a position or an attitude of a second portion with respect to a first portion in an apparatus including the first portion, the second portion, a movable mechanism which allows a first operation for causing the second portion to change from a first position or a first attitude to a second position or a second attitude with respect to the first portion and a second operation for causing the second portion to change from the second position or the second attitude to the first position or the first attitude with respect to the first portion, at least one magnetic sensor provided in one of the first portion or the second portion, and a magnet section which is provided in another of the first portion or the second portion and which provides a magnetic field measured by the at least one magnetic sensor, the program causing the computer to execute:

performing, based on a combination of measured values of at least two components in at least one direction measured by the at least one magnetic sensor at a first time point and reference information indicating the measured values of the at least two components in the at least one direction measured by the at least one magnetic sensor according to the position or the attitude of the second portion with respect to the first portion, an estimation of the position or the attitude of the second portion with respect to the first portion at the first time point, wherein the reference information includes first reference information indicating the measured values of the at least two components in the at least one direction measured by the at least one magnetic sensor according to the position or the attitude of the second portion with respect to the first portion during the first operation, and second reference information indicating the measured values of the at least two components in the at least one direction measured by the at least one magnetic sensor according to the position or the attitude of the second portion with respect to the first portion during the second operation, the program causing the computer to further execute:

selecting, according to a degree of coincidence between the combination of the measured values of the at least two components in the at least one direction measured by the at least one magnetic sensor and each of the first reference information and the second reference information, one of the first reference information or the second reference information which has a higher degree of coincidence with the combination as the reference information used for the estimation of the position or the attitude of the second portion with respect to the first portion in the performing the estimation.

* * * * *